United States Patent [19]
Booth et al.

[11] Patent Number: 5,394,495
[45] Date of Patent: Feb. 28, 1995

[54] OPTICAL WAVEGUIDE CONNECTORS AND METHODS OF MAKING SAME

[75] Inventors: Bruce L. Booth, West Chester, Pa.; Robert J. Furmanak, Wilmington, Del.

[73] Assignee: E. I. Du Pont de Nemours and Company, Wilmington, Del.

[21] Appl. No.: 200,056

[22] Filed: Feb. 22, 1994

[51] Int. Cl.⁶ ............................................. G02B 6/38
[52] U.S. Cl. .................................... 385/59; 385/49; 385/71; 385/80; 430/321
[58] Field of Search .................. 385/49, 50, 53, 54, 385/55, 59, 60, 71, 72, 77, 78, 80, 88, 89; 430/320, 321

[56] References Cited

U.S. PATENT DOCUMENTS

| | | | |
|---|---|---|---|
| 3,689,264 | 9/1972 | Chandross et al. | 430/1 |
| 4,609,252 | 9/1986 | Wong et al. | 385/130 |
| 4,637,681 | 1/1987 | Yamamoto et al. | 385/14 |
| 4,690,472 | 9/1087 | Elco et al. | 439/67 |
| 4,772,086 | 9/1988 | Bellerby et al. | 385/49 X |
| 4,883,743 | 11/1989 | Booth et al. | 430/321 |
| 5,015,059 | 5/1991 | Booth et al. | 385/49 |
| 5,062,681 | 11/1991 | Furmanak et al. | 385/50 |
| 5,125,054 | 6/1992 | Ackley et al. | 385/49 |
| 5,150,440 | 9/1992 | Booth | 385/49 |
| 5,292,620 | 3/1994 | Booth et al. | 385/49 X |
| 5,315,678 | 5/1994 | Maekawa et al. | 385/59 |

FOREIGN PATENT DOCUMENTS

| | | | |
|---|---|---|---|
| 0378226A2 | 7/1990 | European Pat. Off. | G02B 6/12 |
| 2191603A | 12/1987 | United Kingdom | G02B 6/12 |

OTHER PUBLICATIONS

Auracher, F., "Planar Branching Network for Multimode Glass Fibers," Optics Communications, vol. 17, No. 1, Apr. 1976, pp. 129–132.

Kersten, R. Th., "Modified Thick Film Technology for Multimode Integrated Optics," Optics Communications, vol. 28, No. 1, Jan. 1979, pp. 51–54.

*Primary Examiner*—John D. Lee
*Attorney, Agent, or Firm*—John E. Griffiths

[57] ABSTRACT

Optical waveguide connectors for coupling arrays of waveguides and/or optical fibers and to methods of making the connectors. The connectors are optical waveguide or optical fiber connectors for coupling to mating optical waveguide or optical fiber connectors. Optical connector assemblies are provided which comprise optical waveguide or optical fiber connectors in combination with mating optical waveguide or optical fiber connectors. Methods of manufacturing the optical waveguide or optical fiber connectors and the optical connector assemblies are disclosed.

31 Claims, 21 Drawing Sheets

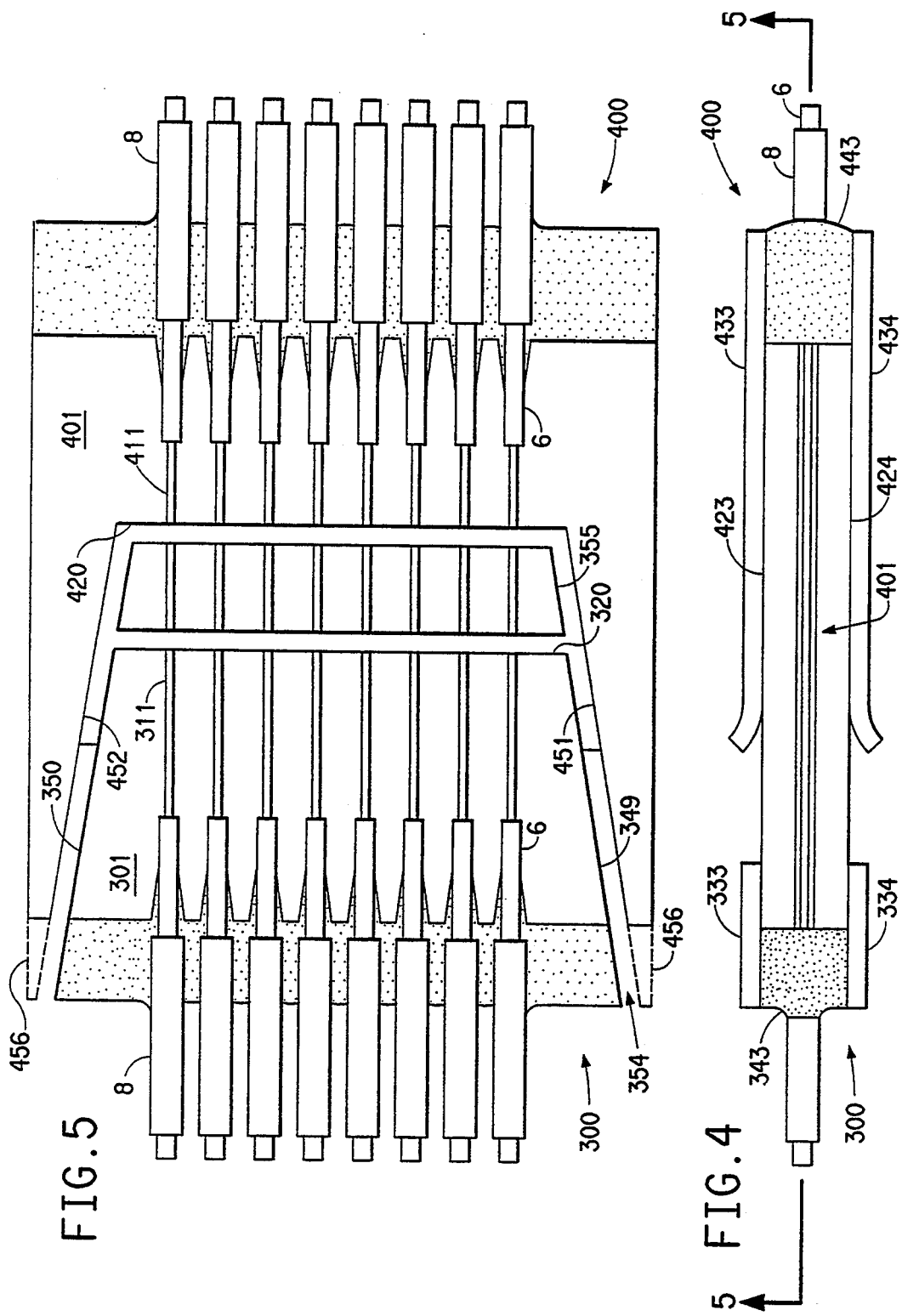

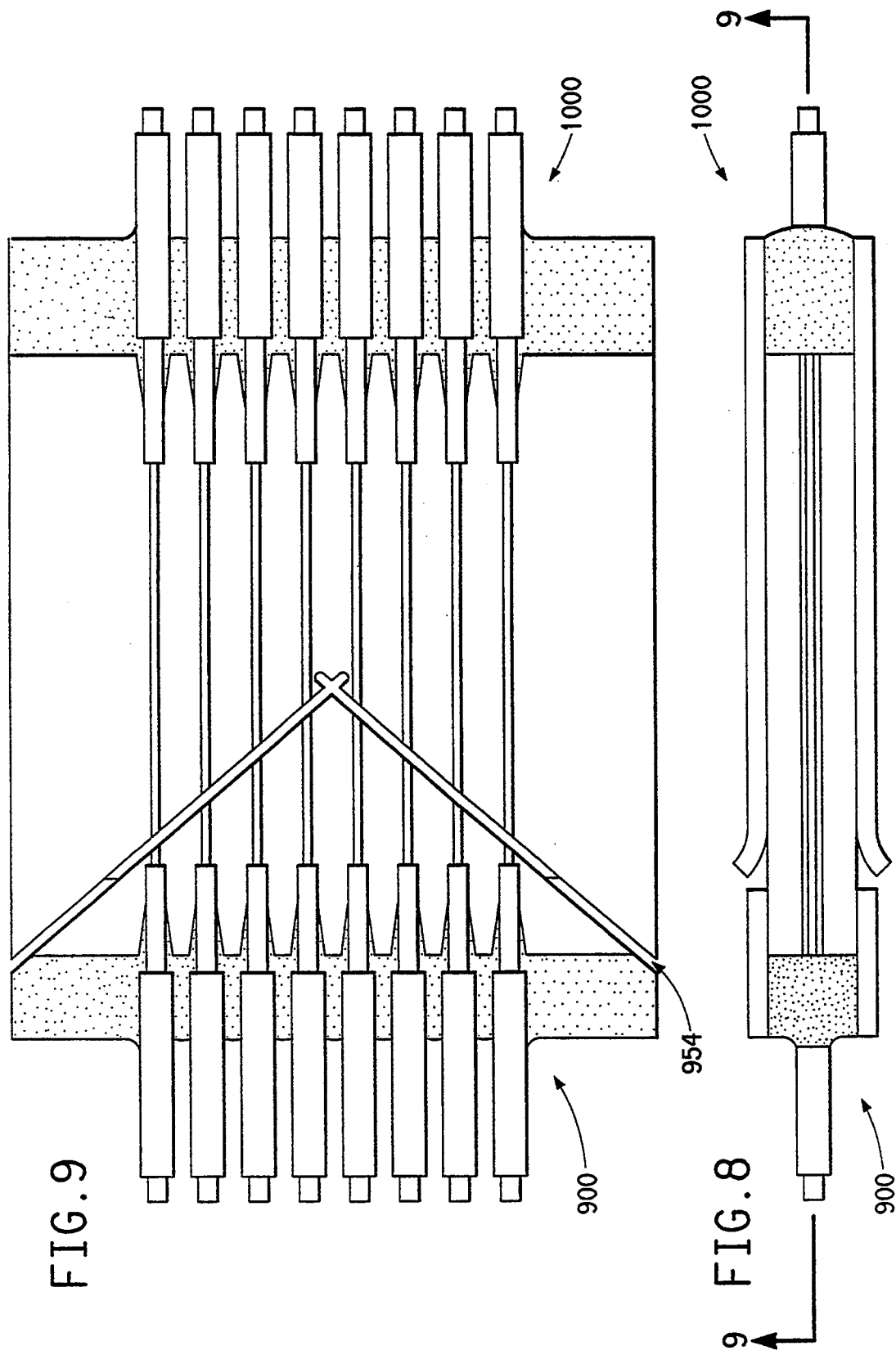

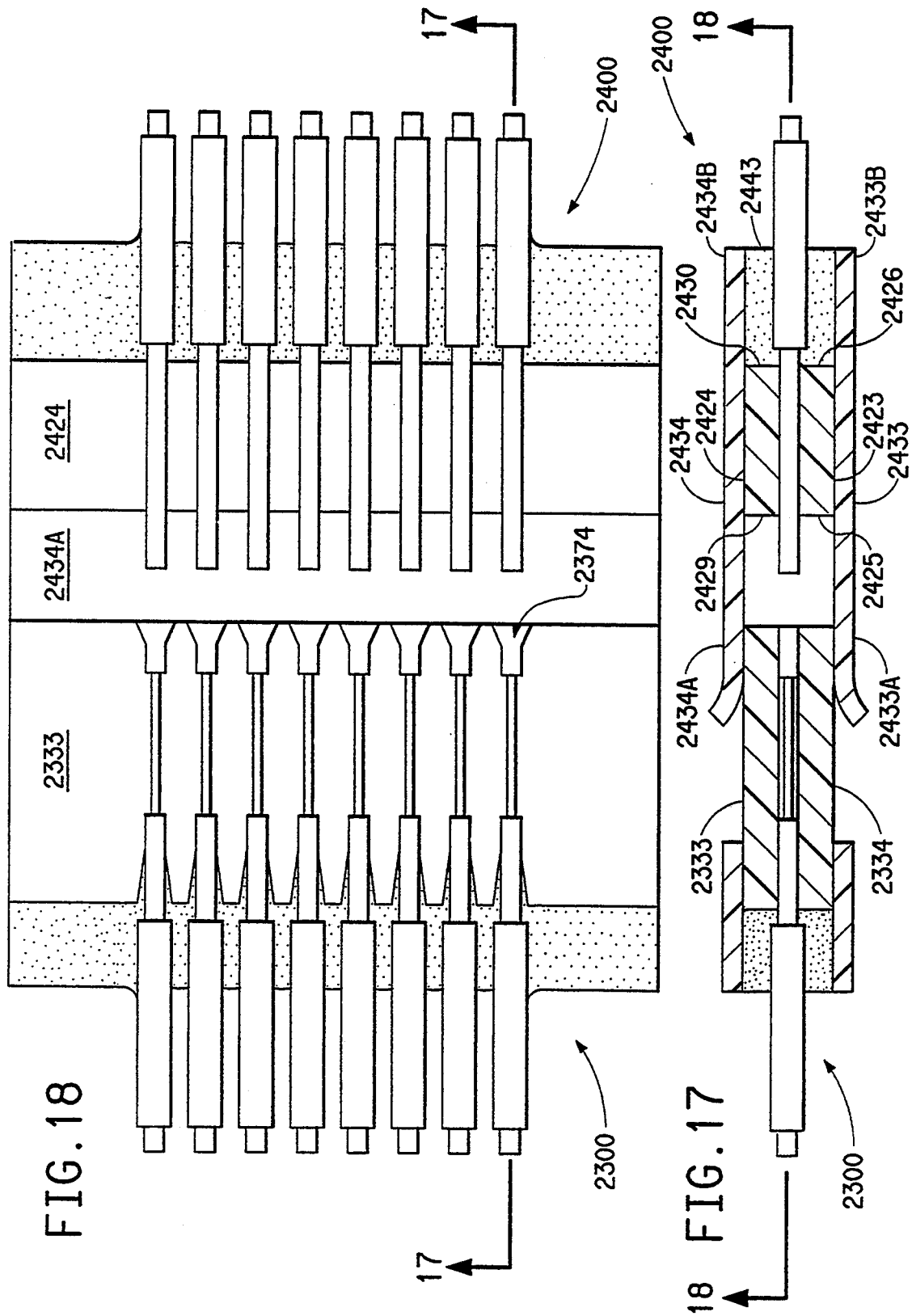

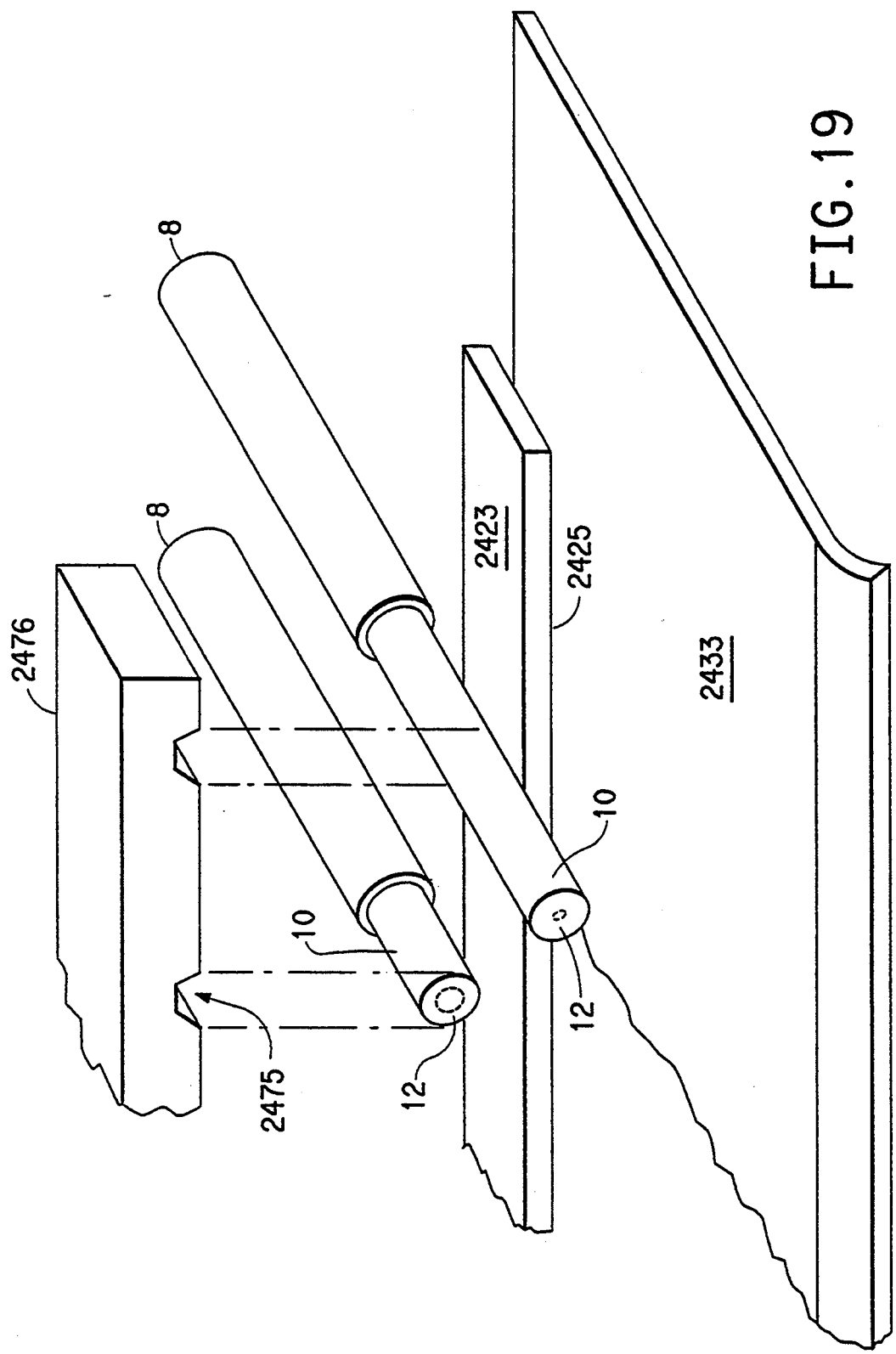

OPTICAL WAVEGUIDE CONNECTORS AND METHODS OF MAKING SAME

BACKGROUND OF THE INVENTION

1. Field of the Invention

This invention relates to optical waveguide connectors for coupling waveguides and/or optical fibers and to methods of making the connectors.

2. Description of Related Art

In optical communication systems, messages are transmitted typically through optical fibers by carrier waves of optical frequencies that are generated by sources, such as lasers or light emitting diodes. There is much current interest in such optical communication systems because they offer several advantages over other communication systems, such as having a greatly increased number of channels of communication and the ability to use other materials besides expensive copper cables for transmitting messages.

One such means for conducting or guiding waves of optical frequencies from one point to another is called an optical waveguide. The operation of an optical waveguide is based on the fact that when a medium which is transparent to light is surrounded or otherwise bounded by another medium having a lower or higher refractive index, light introduced along the inner medium's axis is highly reflected at the boundary with the surrounding medium, thus, producing a guiding effect.

The most frequently used material for such a waveguide device is glass, which is formed into a fiber of specified dimensions. As the development of optical circuits proceeded, it became necessary to have devices which could couple one optical fiber to another.

A traditional way for making a connection between ends of two optical fiber cables is as follows. First, a protective jacket is removed from several inches of each of the optical fiber cables near ends to be joined. When the jacket is removed, the remainder comprises a core surrounded by cladding which together have an outer diameter of about 125 microns ($\mu$m) which is about 3 times the diameter of a human hair. Second, the thin fragile remainder is threaded by hand through a separate ferrule which can be either glued onto the optical fiber with, for instance, epoxy or fixed to the optical fiber by crimping, i.e., squeezing and deforming, a portion of the ferrule firmly around the optical fiber. Traditionally, ferrules were epoxied onto the fibers. More recently, the industry is inclined to crimp ferrules on fibers because it takes significantly less time, i.e., one does not have to wait for the epoxy to dry. Third, the optical fiber extending beyond the end of each of the ferrules is cleaved, which entails scoring and breaking the optical fiber, less than one diameter or 125 $\mu$m beyond the end of the ferrule. Fourth, the ends of the optical fibers are encapsulated in epoxy and then polished, typically, first with a coarse, e.g., 8 $\mu$m, grit paper until the ends extend about 20 to 25 $\mu$m beyond the end of the corresponding ferrules and then with one or more finer, e.g., 1 $\mu$m and/or 0.3 $\mu$m, grit papers until the ends of the optical fibers are flush with the end of their corresponding ferrules. Due to the size of the optical fibers, this polishing requires the skill of an experienced individual to make an acceptable end. Finally, the ferrules are manually inserted into a connector housing assembly which is intended to position the optical fibers such that they are adjacent to one another with their optical axes in alignment with respect to each other. This is a time consuming process which requires skill and, as a result, is costly.

Some optical fibers are interconnected by other optical fibers cut to length. Other optical fibers are interconnected by optical waveguide devices made from materials other than glass.

One method used to form an optical coupling device made from materials other than glass involves the application of standard photolithographic processes and diffusion. See U.S. Pat. No. 4,609,252. However, such methods are relatively time consuming, costly and wet, thereby, messy.

Photohardened films containing a waveguide have been proposed to interconnect one optical fiber to another optical fiber. For example devices, see U.S. Pat. Nos. 3,689,264, 4,609,252, 4,637,681, 4,883,743, and 5,125,054.

However, regardless of how the fibers were connected, connecting optical fibers to one another or to optical waveguide devices has traditionally been a problem. Most connections need to be made by hand. In view of the small dimensions of the fibers, alignment problems exist in most, if not all, connection methods. Because of the alignment problems, most connections are permanent, rather than detachable. Most methods for connecting optical fibers with other fibers, or other types of waveguides, are time consuming processes and costly. When connections are needed between a first plurality of optical waveguides and a second plurality of optical waveguides, the process only becomes more difficult.

SUMMARY OF THE INVENTION

The invention provides a way to connect optical waveguides in a quick, easy and reliable manner. The invention relates to optical waveguide or optical fiber connectors for coupling to mating optical waveguide or optical fiber connectors. The present invention is also directed to optical connector assemblies which comprise optical waveguide or optical fiber connectors in combination with mating optical waveguide or optical fiber connectors. The present invention is also directed to methods of manufacturing and methods of using the optical waveguide or optical fiber connectors and the optical connector assemblies.

Specifically, the present invention is related to an optical waveguide connector, comprising:

a first optical waveguide device including:

a first photohardened layer having a first edge, a second edge, a first side, a second side, non-waveguide regions, at least a first optical waveguide extending from the first edge to the second edge and from the first side to the second side, the waveguide having an optical axis and for channeling and transmitting light between the first and second edges, a first photohardened element having a first edge, a second edge, a first side and a second side, the first side of the first element laminated to the first side of the first layer, and a second photohardened element having a first edge, a second edge, a first side and a second side, the first side of the second element laminated to the second side of the first layer, the non-waveguide regions and the first and second elements enclosing the waveguides except at the first and second edges;

a housing including:
  a first wall having a first edge, a second edge, a first side and a second side, the first side of the first wall adhered to and substantially covering the second side of the first element,
  a second wall having a first edge, a second edge, a first side and a second side, the first side of the second wall adhered to and substantially covering the second side of the second element, and
  the first and second walls providing mechanical rigidity to the device; and
wherein the first optical waveguide device and the housing further comprise:
  first means for mechanically coupling a first end of the first waveguide to a corresponding end of a second waveguide in a second optical waveguide device of a second optical connector;
  second means for optically aligning the optical axis of the first waveguide with an optical axis of the second waveguide; and
  third means for mechanically coupling and optically aligning a second end of the first waveguide (i) to a corresponding end of a third waveguide in a third optical waveguide device or (ii) to at least a corresponding first optical fiber.

The invention further relates to a optical waveguide connector assembly, comprising:
a first optical waveguide connector comprising:
a first optical waveguide device including:
  a first photohardened layer having a first edge, a second edge, a first side and a second side, non-waveguide regions, and a first plurality of optical waveguides extending from the first edge to the second edge and from the first side to the second side, the waveguides having optical axes and for channeling and transmitting light between the first and second edges,
  a first photohardened element having a first edge, a second edge, a first side and a second side, the first side of the first element laminated on the first side of the first layer; and
  a second photohardened element having a first edge, a second edge, a first side and a second side, the first side of the second element laminated on the second side of the first layer, the non-waveguide regions and the first and second elements enclosing the waveguides except at the first and second edges;
a first housing including:
  a first wall having a first edge, a second edge, a first side and a second side, the first side of the first wall adhered to the second side of the first element,
  a second wall having a first edge, a second edge, a first side and a second side, the first side of the second wall adhered to the second side of the second element,
  a third wall having a first edge, a second edge, a first side and a second side, a portion of the first side of the third wall adhered to the second side of the first wall, and
  a fourth wall having a first edge, a second edge, a first side and a second side, the first side of the fourth wall adhered to the second side of the second wall; and
wherein the first optical waveguide device and the first housing further comprise:
  first means for mechanically coupling first ends of the first waveguides to corresponding ends of second waveguides in a second optical waveguide device;
  second means for optically aligning the optical axes of the first waveguides with optical axes of the second waveguides; and
  third means for mechanically coupling and optically aligning second ends of the first waveguides (i) to corresponding ends of third waveguides in a third optical waveguide device or (ii) to corresponding optical fibers; and
a second optical waveguide connector comprising:
a second optical waveguide device including:
  a first photohardened layer having a first edge, a second edge, a first side and a second side, non-waveguide regions, and a first plurality of optical waveguides extending from the first edge to the second edge and from the first side to the second side, the waveguides having optical axes and for channeling and transmitting light between the first and second edges,
  a first photohardened element having a first edge, a second edge, a first side and a second side, the first side of the first element laminated on the first side of the first layer; and
  a second photohardened element having a first edge, a second edge, a first side and a second side, the first side of the second element laminated on the second side of the first layer, the non-waveguide regions and the first and second elements enclosing the waveguides except at the first and second edges;
a second housing including:
  a first wall having a first edge, a second edge, a first side and a second side, the first side of the first wall adhered to the second side of the first element, and
  a second wall having a first edge, a second edge, a first side and a second side, the first side of the second wall adhered to the second side of the second element; and
wherein the second optical waveguide device and the second housing further comprise:
  fourth means for mechanically coupling first ends of the first waveguides in the second device to corresponding ends of the first waveguides in the first device;
  fifth means for optically aligning the optical axes of the first waveguides in the second device with optical axes of the first waveguides in the first device; and
  sixth means for mechanically coupling and optically aligning second ends of the first waveguides in the second device (i) to corresponding ends of fourth waveguides in a fourth optical waveguide device or (ii) to corresponding optical fibers.

The invention is further directed to an optical waveguide connector, comprising:
a first plurality of optical fibers, each including:
  a cylindrical core having an optical axis and a first end, and
  a cylindrical tubular cladding surrounding the core except near an end portion of the core near the core first end;
a first wall having a first edge, a second edge, a first side and a second side, the first end portions of the first plurality of optical fibers positioned substantially parallel to one another on the first side of the first wall such that the first ends extend from or to the first edge;

a second wall having a first edge, a second edge, a first side and a second side, the first side of the second wall on the first end portions of the first plurality of optical fibers;

a third wall having a first edge, a second edge, a first side and a second side, the first side of the third wall adhered to the second side of the first wall, the third wall having:

a first portion extending beyond the first edge of the first and second walls; and a second portion extending beyond the second edge of the first and second walls;

a fourth wall having a first edge, a second edge, a first side and a second side, the first side of the fourth wall adhered to the second side of the second wall, the fourth wall having:

a first portion extending beyond the first edge of the first and second walls; and a second portion extending beyond the second edge of the first and second walls;

the first plurality of optical fibers extending between the third wall second portion and the fourth wall second portion;

a photohardened filler between the first wall, the second wall and the first end portions of the first plurality of optical fibers, the filler also between the third wall second portion, the fourth wall second portion and the first plurality of optical fibers; and the first wall, the second wall, the third wall, and the fourth wall defining a recess for mechanically coupling the first ends of the optical fibers to corresponding ends of a plurality of waveguides or optical fibers.

BRIEF DESCRIPTION OF THE DRAWINGS

The invention can be more fully understood from the following detailed description thereof in connection with accompanying drawings described as follows.

FIG. 4 is an edge or side view of the second embodiment of the optical waveguide coupling assembly of FIG. 3.

FIG. 5 is a cross sectional view taken generally along line 5—5 in FIG. 4 in the direction of the arrows.

FIG. 8 is an edge or side view of the fifth embodiment of the triangular shaped optical waveguide coupling assembly of FIG. 7.

FIG. 9 is a cross sectional view taken generally along line 9—9 in FIG. 8 in the direction of the arrows.

FIG. 17 is a cross sectional view of the twelfth embodiment of the optical waveguide coupling assembly of FIGS. 16 and 18 taken generally along line 17—17 in FIG. 18 in the direction of the arrows.

FIG. 18 is a cross sectional view taken generally along line 18—18 in FIG. 17 in the direction of the arrows.

FIG. 19 is a perspective view illustrating a manufacturing step in forming the twenty-fourth connector in the optical waveguide coupling assembly of FIG. 16 with parts exploded from one another.

DESCRIPTION OF THE PREFERRED EMBODIMENT(S)

Figure 1:
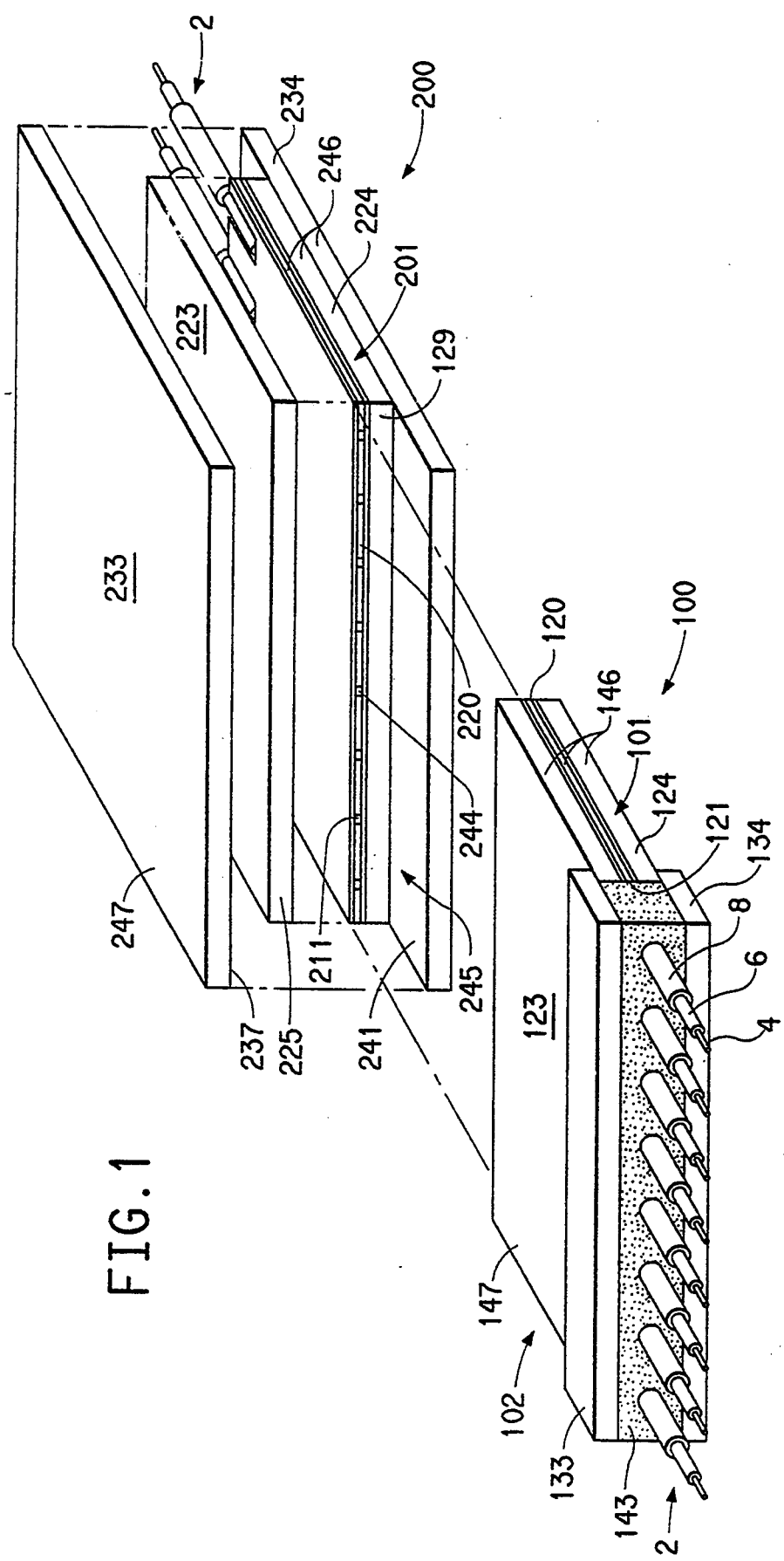
FIG. 1 is a perspective view of a first embodiment of an optical waveguide coupling assembly comprising a first optical waveguide connector matable with a second optical connector in accordance with the present invention.

Throughout the following detailed description, the same element appearing in more than one view is always designated by the same character. Similar reference characters, differing by multiples of hundred, refer to similar elements in different embodiments in all figures of the drawings.

Referring to FIG. 1, there is illustrated a first optical waveguide coupling assembly in accordance with the present invention. The first optical waveguide coupling assembly comprises a first optical waveguide connector 100 matable with a second optical waveguide connector 200.

Figure 2:
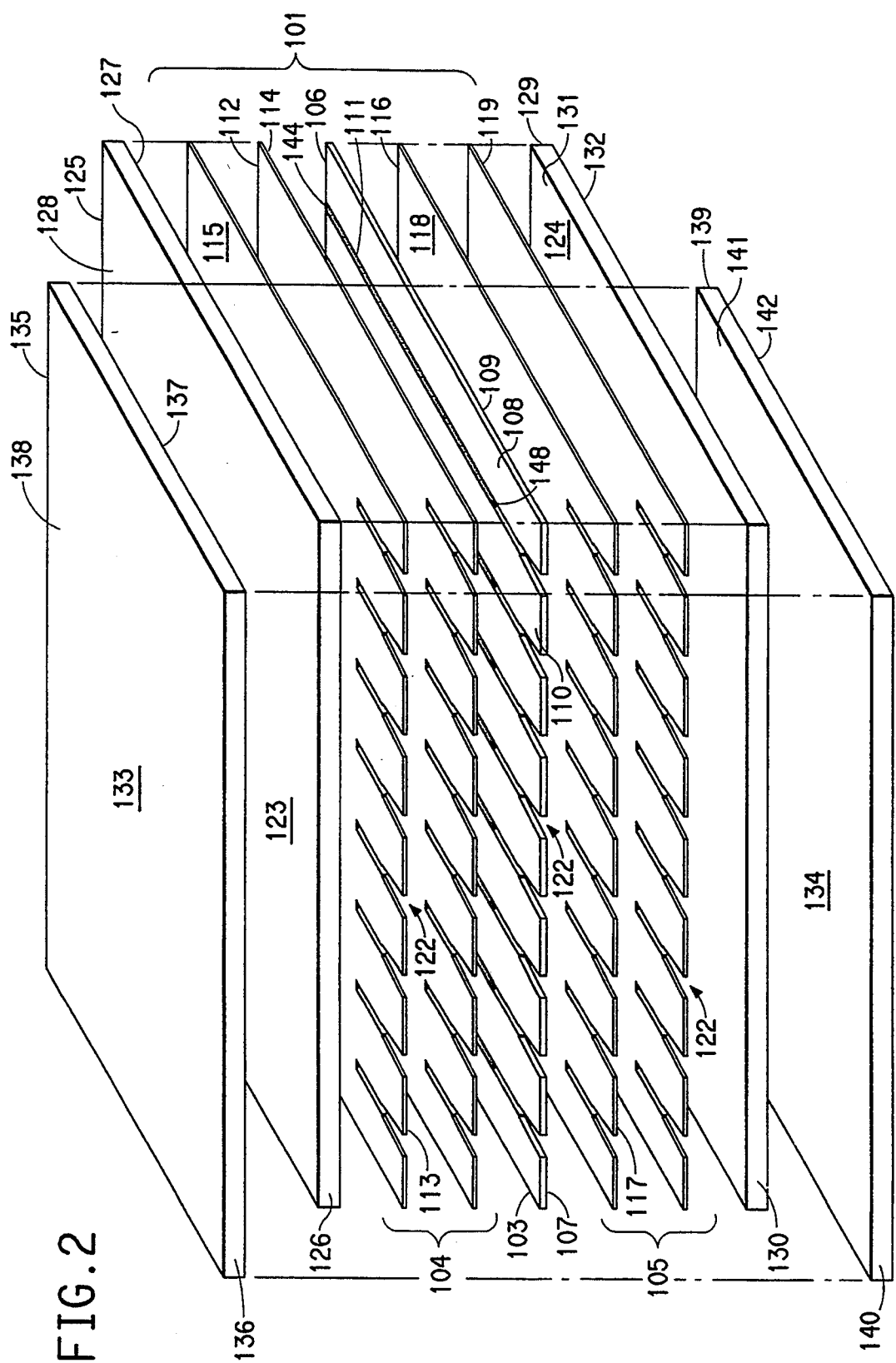
FIG. 2 is a perspective view of part of the first optical connector including an optical waveguide device comprising a photohardened waveguide layer between a first photohardened element and a second photohardened element with parts exploded from one another.

The first optical waveguide connector 100 includes a first optical waveguide device 101 and a first housing 102. Referring to FIG. 2, which shows parts of the first optical waveguide connector 100 exploded from one another, the first optical waveguide device 101 includes a first photohardened layer 103, a first photohardened element 104 and a second photohardened element 105. The first photohardened layer 103 has a first edge 106, a second edge 107, a first side 108, a second side 109, non-waveguide regions 110, and at least one, and preferably a first plurality of, optical waveguides 111 extending from the first edge 106 to the second edge 107 and from the first side 108 to the second side 109. Referring back to FIG. 2, the waveguides 111 have optical axes and are for channeling and transmitting light between the first edge 106 and the second edge 107. Each one of the first and second photohardened elements 104,105 can comprise one or more photohardened films laminated together. FIG. 2 illustrates the first and second photohardened elements 104,105 each having a pair of photohardened films laminated together. The first photohardened element 104 has a first edge 112, a second edge 113, a first side 114 and a second side 115. The first side 114 of the first element 104 is laminated to the first side 108 of the first layer 103. The second photohardened element 105 has a first edge 116, a second edge 117, a first side 118 and a second side 119. The first side 118 of the second element 105 is laminated to the second side 109 of the first layer 103. The non-waveguide regions 110, the first element 104 and the second element 105 enclose the waveguides 111 except at the first and second edges 106,107 of the first layer 103. The first edges 106,112,116 of the first layer 103, the first element 104 and the second element 105 comprise a first or leading edge 120 (see FIG. 1) of the device 101. Similarly, the second edges 107,113,117 of the first layer 103, the first element 104 and the second element 105 comprise a second or trailing edge 121 (see FIG. 1) of the device 101. The second edges 107,113,117 may define a plurality of slots or recesses 122 for receiving ends of optical fibers 2 (see FIG. 1). The recesses 122 can have diverging edges to facilitate inserting of the fibers 2 into the recesses 122. The first optical waveguide device 101 can be made by any method and preferably as disclosed in U.S. patent application Ser. No. 08/045,280 filed Apr. 8, 1993 and U.S. Pat. No. 4,883,743.

In one embodiment, the first layer 103 has a thickness of about 44 microns for mating with a first plurality of the optical fibers 2 with 125 micron diameter cladding 6 having 50 micron diameter cores 4 for operating in multi-mode. In this embodiment, each one of the elements 104,105 comprise a single buffer layer having a thickness of about 38 microns laminated to the first layer 103. In another embodiment, the first layer 103 has a thickness of about 5 to 6 microns for mating with a first plurality of the optical fibers 2 with 125 micron diameter cladding 6 having 7 micron diameter cores 4 for operating in single mode. In this embodiment, each one of the elements 104,105 comprise a first inner buffer layer having a thickness of about 30 microns laminated to the first layer 103 and a second outer buffer layer having a thickness of about 28 microns laminated to the first inner buffer layer. In all embodiments, the fibers can also have a protective jacket 8 having a 250 micron diameter surrounding the cladding 6.

The housing 102 includes a first wall 123 and a second wall 124. The first wall 123 has a first edge 125, a second edge 126, a first side 127 and a second side 128. The first side 127 of the first wall 123 is laminated or otherwise adhered to and substantially covering the second side 115 of the first element 104. The second wall 124 has a first edge 129, a second edge 130, a first side 131 and a second side 132. The first side 131 of the second wall 124 is laminated or otherwise adhered to and substantially covering the second side 119 of the second element 105. The first wall 123 and the second wall 124 are for providing mechanical rigidity to the first device 101. The first and second walls 123,124 can be made of any suitable material, such as polycarbonate or the same material as the first layer 103 and the elements 104,105 of the first device 101. If photohardenable materials are used for the first and second walls 123,124, such as the same material as the first layer 103 and the elements 104,105 of the first device 101, then the first and second walls 123,124 can be adhered to the device 101 by exposing the connector 100 once assembled to actinic radiation, e.g., light. Otherwise, it may be necessary or desired to use an adhesive, such as a photocurable adhesive, in adhering the first and second walls 123,124 to the first device 101. Preferably, the first and second walls 123,124 are substantially thicker (e.g., about 10 times thicker) than the first layer 103. For instance, each can be about 360 microns thick.

The first housing 102 may optionally further comprise a third wall 133 and a fourth wall 134. The third wall 133 has a first edge 135, a second edge 136, a first side 137 and a second side 138. A portion of the first side 137 of the third wall 133 is adhered to the second side 128 of the first wall 123. The fourth wall 134 has a first edge 139, a second edge 140, a first side 141 and a second side 142. A portion of the first side 141 of the fourth wall 134 is adhered to the second side 132 of the second wall 124. The third and fourth walls 133,134 can be made of the same materials as the first and second walls 123,124. As with the first and second walls 123,124, depending on the materials used, it may be necessary or desired to use an adhesive, such as a photocurable adhesive, in adhering the third and fourth walls 133,134 to the first and second walls 123,124. The third and fourth walls 133,134 can be about the same thickness as the first and second walls 123,124.

Referring to FIG. 1, the housing 102 further includes a photohardened filler 143 between the third wall 133, the fourth wall 134 surrounding first end portions of the first plurality of optical fibers 2. The filler 143 seals the end portions of the fibers 2 from the environment and secures ends of the fibers 2 adjacent ends of the waveguides 111 in the slots or recesses 122 with optical axes of the fibers in alignment with the optical axes of the waveguides 111. The third and fourth walls 133,134 can be used as a mold in forming the photohardened filler 143. Liquid photohardenable material can be inserted between the third and fourth walls 133,134 and then hardened, such as, by expose to light. The liquid photohardenable material is chosen such that when hardened the material securely bonds the fibers to the connector 100 and preferably the refractive index of the hardened material approximately matches the refractive index of the waveguides 111 and the optical fibers 4. Suitable liquid photohardenable materials are commercially available. After the liquid photohardenable material is hardened, the third and fourth walls 133,134 can be removed from the first connector 100.

The first waveguide device 101 and the first housing 102 include parts that comprise first mechanically coupling and optically aligning means and second mechanically coupling and optically aligning means. The first means is for mechanically coupling and optically aligning the first ends 144 of the first waveguides 111 to corresponding ends 244 of second waveguides 211 in the second optical waveguide device 201 of the second optical connector 200. The second means is for mechanically coupling and optically aligning the second ends 148 of the first waveguides 111 (i) to corresponding ends of a third waveguide in a third optical waveguide device or (ii) to corresponding first optical fibers 2.

In the first assembly illustrated in FIG. 1, the first mechanically coupling and optically aligning means is repetitively connectable to and detachable from the second optical waveguide device 201. However, it is possible to permanently bond the first connector 100 to the second connector 200 together such as through the use of an appropriate adhesive. For instance, the adhesive could bond the second sides 128,132 of the first and second walls 123,124 of the first connector 100 to the first sides 237,241 of the third and fourth walls 233,234 in the slot 245 of the second connector 200. Also in the first assembly illustrated in FIG. 1, the second mechanically coupling and optically aligning means permanently bonds the second ends 148 of the waveguides 111 to ends of fibers 2. However, alternative means can be used that makes the second ends 148 of the waveguides 111 repetitively connectable to and detachable from (i) to corresponding ends of a third waveguide in a third optical waveguide device or (ii) to corresponding first optical fibers 2.

The first mechanically coupling and optically aligning means comprises third means for optically aligning the optical axes of the first waveguides 111 with optical axes of the second waveguides 211. The third aligning means comprises a first planar alignment face 146 for positioning in a plane with a first planar alignment face 246 on the second connector 200. The first alignment face 146 comprises an edge of the first device 101. Preferably, the first alignment face 146 also comprises an edge of the first wall 123 and the second wall 124. The first alignment face 146 can also comprise an edge of the third wall 133 and the fourth wall 134. When the first planar alignment face 146 on the first connector 100 and the first planar alignment face 246 on the second connector 200 are positioned in the same plane with the device 101 fully inserted in the slot 245, the optical axes of the first waveguides 111 are optically aligned with the optical axes of the second waveguides 211. This positioning can be performed merely with one's finger tips. Alternatively, the first planar alignment face 146 and the first planar alignment face 246 can be positioned in the same plane by positioning the first planar alignment faces 146 and 246 against a planar surface, such as of a block. One does not need to direct light through the waveguides 111,211 to align them as in prior art aligning techniques. Preferably, the fourth aligning means further comprises a second planar alignment face 147 for positioning in a plane with a second planar alignment face 247 on the second connector 200. The second alignment face 147 comprises another edge of the first device 101. Preferably, the second alignment face 147 also comprises another edge of the first wall 123 and the second wall 124. The second alignment face 147 can also comprise another edge of the third wall 133 and the fourth wall 134.

The first mechanically coupling and optically aligning means further comprises fourth means for mechanically coupling first ends 144 of the first waveguides 111 to corresponding ends 244 of second waveguides 211 in a second optical waveguide device 201. The fourth mechanically coupling means can be areas of the second sides 128,132 of the first and second walls 123,124 that are not covered by the third and fourth walls 133,134. These uncovered areas can be for inserting in a friction fit manner in a slot 245 of the second connector 200. In other words, the third mechanically coupling means can have the first edges 135,139 of the third wall 133 and the fourth wall 134 spaced from the first edges 125,129 of the first wall 123 and the second wall 124, respectively, such that the second sides 128,132 of the first wall 123 and the second wall 124 have areas which are not covered by the third wall 133 and the fourth wall 134 and which are for inserting in a friction fit manner in a slot 245 of the second connector 200. In this respect, the first connector 100 is a header and the second connector 200 is a receptacle.

The second mechanically coupling and optically aligning means is for mechanically coupling and optically aligning second ends 148 of the first waveguides 111 to corresponding ends of the first plurality of optical fibers 2. The second ends 148 of the first waveguides 111 are coupled to corresponding ones of the first plurality of optical fibers 2 such that the optical axes of the waveguides 111 are aligned or substantially in alignment with the optical axes of the coupled fibers 2. Any method can be used to couple the fibers 2 to the waveguides 111. One acceptable method is disclosed in U.S. Pat. No. 5,150,440. In the embodiment of the connector 100 illustrated in FIGS. 1 and 2, the recesses 122 and the photohardened filler 143 comprise the second means.

The second optical waveguide connector 200 can be the same or substantially the same as the first optical waveguide connector 100, except the fourth mechanically coupling means of the second connector 200 differs from the fourth mechanically coupling means of the first connector 100. The fourth mechanically coupling means of the second connector 200 comprises the slot 245 defined by the third wall first side 237, the fourth wall first side 241, the first wall first edge 225, the second wall first edge 229, and the second waveguide device first edge 220. Thus, in the second connector 200, the third wall 233 and the fourth wall 234 are not optional. They are mandatory. The slot 245 is for receiving in a friction fit manner the end of the first connector 100. For better visibility of internal parts, FIG. 1 illustrates the first wall 223 and the third wall 233 exploded or spaced from the remainder of the second connector 200, but it is to be understood that the completed second connector 200 has the first wall 223 adhered to the second optical waveguide device 201 and the third wall 233 adhered to the first wall 223. For further clarification, the photohardened filler 243 is not depicted, but is present, in the second connector 200 as the filler 143 is shown present in the first connector 100.

The first optical waveguide coupling assembly can be made by making the first optical waveguide device 101 and the second optical waveguide device 201 as a single, integral, one-piece device and then cutting the single device 101+201 into two separate pieces—the first device 101 and the second device 201. (Note, the plus sign "+" is used between two designating numbers throughout this specification to indicate that two elements represented by the two designating numbers are a single piece, rather than two distinct pieces, at some point in time in the manufacturing process.) Preferably, the first planar alignment face 146 of the first connector 100 and the first alignment face 246 of the second connector 200 are made into parts from a single planar face 146+246 before the single piece face 146+246 is cut into two pieces. In other words, the single piece device 101+201 should be made to have the single face 146+246 before the single device 101+201 is cut separating the first device 101 from the second device 201. The cutting step can be performed with a suitable cutting device, such as a sharp edge, a diamond knife or by ablative radiation from an appropriate source, such as an excimer laser, a high energy ultraviolet light, an ion or particle beam or the like. By making the first optical waveguide device 101 and the second optical waveguide device 201 in this fashion, the optical axes of the first plurality of optical waveguides 111 are all aligned with respective ones of the optical axes of the second plurality of optical waveguides 211 by merely placing the first alignment face 146 adjacent and in the same plane as the second alignment face 246 and fully inserting the first end 120 of the first device 101 into the slot 245.

More specifically, the first connector assembly can be made by the following substantially dry method. The first step of the method can comprise exposing to light at least a first region of a substantially dry photohardenable layer 103+203 having first and second sides, with a support removably adhered to the first side, polymerizing at least one monomer in the layer and changing the refractive index of the region to form at least a first optical waveguide. The second step is laminating a first side of a first substantially dry photohardenable element 104+204 to the photohardenable layer second side, with a support removably adhered to a second side of the first element 104+204. The third step is, after the exposing step and then the first laminating step, removing the support from the layer first side. The fourth step is laminating a first side of a second substantially dry photohardenable element 105+205 to the photohardenable layer first side, with a support removably adhered to a second side of the second element 105+205. The fifth step is, after the second laminating step, hardening the elements and layer forming a hardened matrix, substantially fixing the indices of refraction of the elements and the layer, and forming at least one buried waveguide 111+211. The sixth step is removing the supports from the first element second side and the second element second side and adhering the first wall 123,223 on the first element second side and the second wall on the second element second side. The seventh step is separating or cutting the hardened matrix into the first device 101 containing a first part 111 of the one buried waveguide and a second device 201 containing a second part 211 of the one buried waveguide and providing an alignment mechanism 146,246 to facilitate coupling of the first connector 100 and the second connector 200 such that when mated an optical axis of the first waveguide part 111 is aligned with an optical axis of the second waveguide part 211. The eighth step is adhering the third wall 233 on the first wall 223 in the second connector 200 and the fourth wall 234 on the second wall 224 in the second connector 200 thereby forming a slot 245 for receiving the first connector 100 in a detachable friction fit manner with the optical axis of the first waveguide part 111 aligned with the optical axis of the second waveguide part 211. Another step is adhering the third wall 133 on the first wall 123 in the first connector 100 and the fourth wall 134 on the second wall 124 in the first connector 100 thereby forming a space for receiving the fibers 2 and the filler 143.

Figure 3:
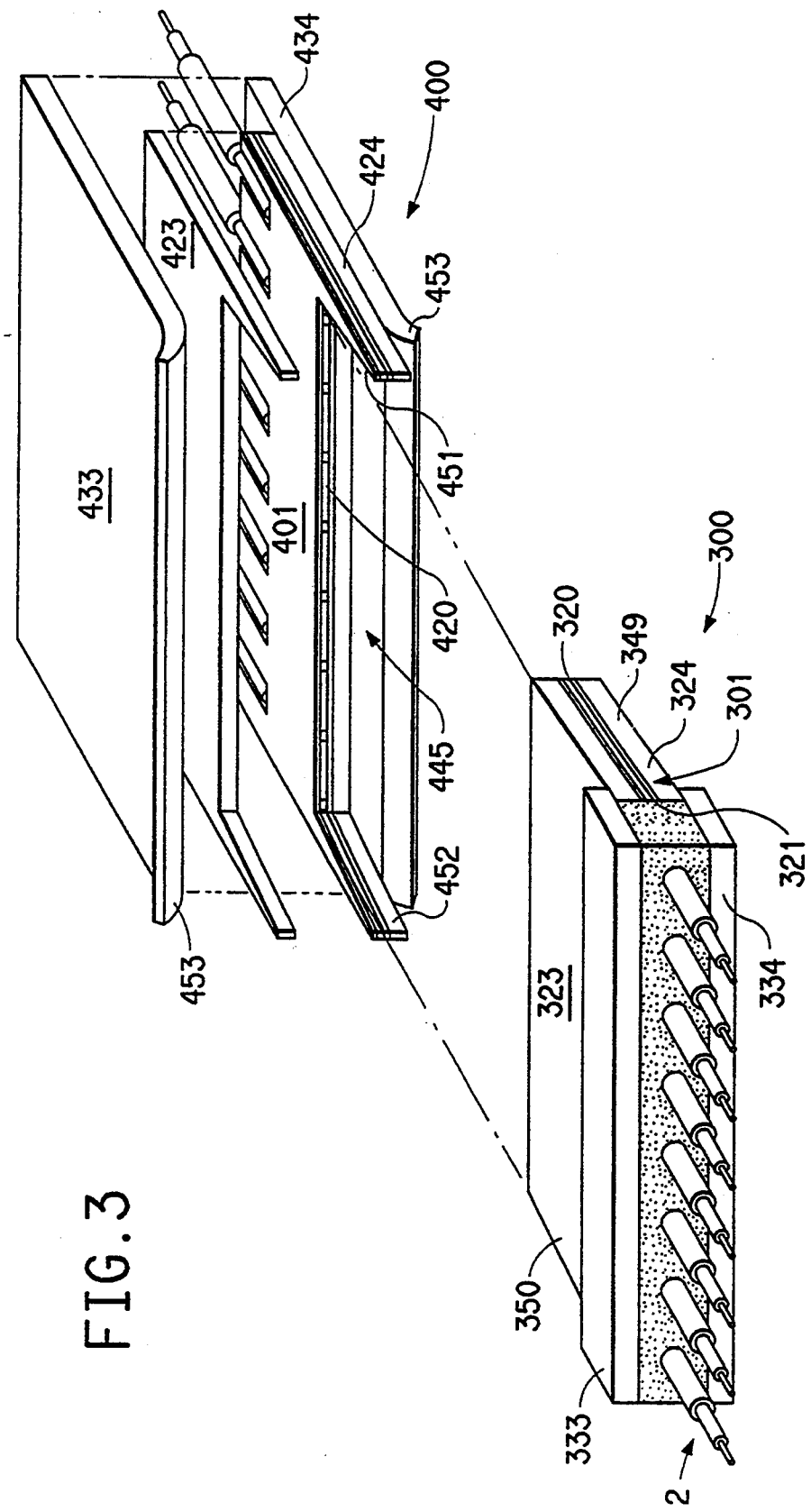
FIG. 3 is a perspective view of a second embodiment of an optical waveguide coupling assembly comprising a third keystone shaped optical waveguide connector matable with a fourth optical waveguide connector with a keystone shaped slot in accordance with the present invention.

FIG. 3 illustrates a second optical waveguide coupling assembly in accordance with the present invention. The second optical waveguide coupling assembly comprises a third optical waveguide connector 300 matable with a fourth optical waveguide connector 400. The third optical waveguide connector 300 is a header. The fourth optical waveguide connector 400 is a receptacle.

The third optical waveguide connector 300 is the same as the first optical waveguide connector 100, except the shape of the first wall 323, the second wall 324, and the third optical waveguide device 301 differs from the shape of the first wall 123, the second wall 124, and the first optical waveguide device 101. In the first connector 100, the first wall 123, the second wall 124, and the first optical waveguide device 101 are square or rectangular. In contrast, in the third connector 300, the first wall 323, the second wall 324, and the first optical waveguide device 301 are keystone or substantially keystone shaped. More specifically, the third aligning means of the third connector 300 further comprises a third planar edge 349 and a fourth planar edge 350. The third planar edge 349 comprises a third planar edge of each one of the first wall 323, the second wall 324, and the device 301. The fourth planar edge 350 comprises a fourth planar edge of each one of the first wall 323, the second wall 324, and the device 301. Preferably, the third and fourth planar edges 349,350 intersect ends of the first and second edges 320,321 of the device 301.

The third planar edge 349 is spaced a distance from the fourth planar edge 350 such that the distance progressively increases as distance from the first edge 320 increases.

The fourth optical waveguide connector 400 is the same as the second optical waveguide connector 200, except the shape of the first wall 423, the second wall 424, and the fourth optical waveguide device 401 differs from the shape of the first wall 223, the second wall 224 and the second optical waveguide device 201. In the second connector 200, the sides of the first wall 223, the second wall 224 and the optical waveguide device 201 are square or rectangular. In contrast, in the fourth connector 400, the sides of the fourth optical waveguide device 401 are not square or rectangular. As a result, the third aligning means of the fourth connector 400 is different than the third aligning means of the second connector 200. The third aligning means in the fourth connector 400 comprises a third planar edge 451 and a fourth planar edge 452. The third and fourth planar edges 451,452 intersect ends of the first edge 420. The third planar edge 451 is spaced a distance from the fourth planar edge 452 such that the distance progressively increases as distance from the first edge 420 increases. As such, a keystone shaped slot 445 is defined by the first, third and fourth edges 420,451,452 which guide the keystone shaped first wall 323, second wall 324 and third optical waveguide device 301 to a mated position when fully inserted in the slot 445 of the fourth connector 400.

FIG. 3 depicts the fourth connector 400 with a further difference from the second connector 200 depicted in FIG. 1. FIG. 3 depicts the fourth connector 400 having third aligning means with its third wall 433 and its fourth wall 434 having first end portions 453 which diverge from the other one. This is an optional feature that can be added to the second connector 200.

FIG. 4 is an edge or side view of the second embodiment of the optical waveguide coupling assembly of FIG. 3. FIG. 5 is a cross sectional view taken generally along line 5—5 in FIG. 4 in the direction of the arrows. FIG. 5 illustrates an additional step in the separating or cutting step of the method of making the second connector assembly. The additional step is only required when a strip 355 of the first wall 323+423, the second wall 324+424 and the device 301+401 is removed or cut away and discarded in separating and forming a path 354 between the first wall 323, the second wall 324, and the third device 301 and the first wall 423, the second wall 424 and the fourth device 401, such as through the use of an ablative laser. To cause the first wall 323, the second wall 324 and the third device 301 to fill the slot 445, an end portion 355 can be cut off the first wall 323, the second wall 324, and the third device 301. The end portion 355 is measured such that the first edge 320 of the third device 301 is the same length as the first edge 420 of the fourth device 401. Corners 456 can also be removed to make the connector assembly more compact when fully mated.

Figure 5A:
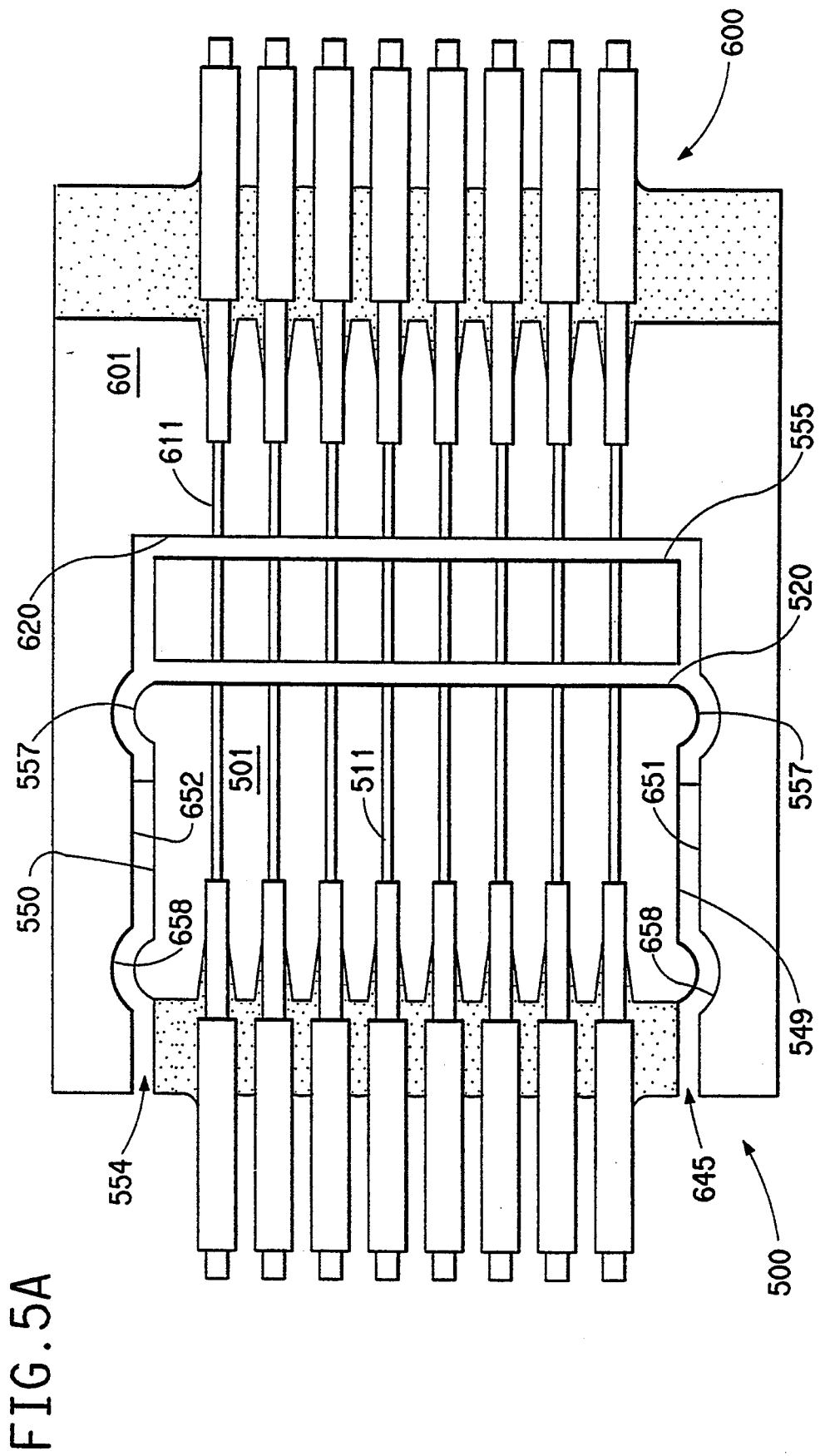
FIG. 5A is a cross sectional view of a third embodiment of an optical waveguide coupling assembly including a fifth optical connector and a sixth optical connector.

FIG. 5A is a cross sectional view of a third embodiment of an optical waveguide coupling assembly including a fifth optical connector 500 and a sixth optical connector 600. The fifth optical connector 500 is the same as the third optical waveguide connector 300, except the shape of the first wall 523, the second wall 524, and the fifth optical waveguide device 501 differs from the shape of the first wall 323, the second wall 324, and the third optical waveguide device 301. As such, the third aligning means of the fifth connector 500 comprises a third edge 549 and a fourth edge 550 which differ in shape and orientation than the third edge 349 and the fourth edge 350. The third edge 549 comprises a third edge of the first wall 523, the second wall 524, and the fifth device 501. The fourth edge 550 comprises a fourth edge of the first wall 523, the second wall 524, and the fifth device 501. The third and fourth edges 549,550 intersect ends of the first edge 520. The third and fourth edges 549,550 are parallel or substantially parallel to one another except where they have projections 557.

The sixth optical waveguide connector 600 is the same as the fourth optical waveguide connector 400, except the shape of the first wall 623, the second wall 624, and the sixth optical waveguide device 601 differs from the shape of the first wall 423, the second wall 424 and the fourth optical waveguide device 401. As a result, the third aligning means of the sixth connector 600 differs from the third aligning means of the fourth connector 400. The third aligning means of the sixth connector 600 comprises a third edge 651 and a fourth edge 652 which differ in shape and orientation than the third edge 451 and the fourth edge 452. The third edge 651 comprises a third edge of the first wall 623, the second wall 624, and the sixth device 601. The fourth edge 652 comprises a fourth edge of the first wall 623, the second wall 624, and the sixth device 601. The third and fourth edges 651,652 intersect ends of the first edge 620. The third and fourth edges 651,652 are parallel or substantially parallel to one another except where they have indentations 658. The first, third and fourth edges 620,651,652 define a recess 645 for receiving the fifth connector 500 with the third and fourth edges 651,652 substantially parallel to the third and fourth edges 549,550 except where they have projections 557 or indentations 658. The projections 557 and indentations 658 are interchangeable in that the projections 557 can be on the sixth connector 600. In which case, the indentations 658 will be on the fifth connector 500.

Similar to the strip 355 in the second assembly illustrated in FIG. 5, the strip 555 of the first wall 523+623, the second wall 524+624 and the device 501+601 is removed or cut away and discarded in separating and forming a path 554 between the first wall 523, the second wall 524, and the device 501 and the first wall 623, the second wall 624 and the device 601.

Figure 5B:
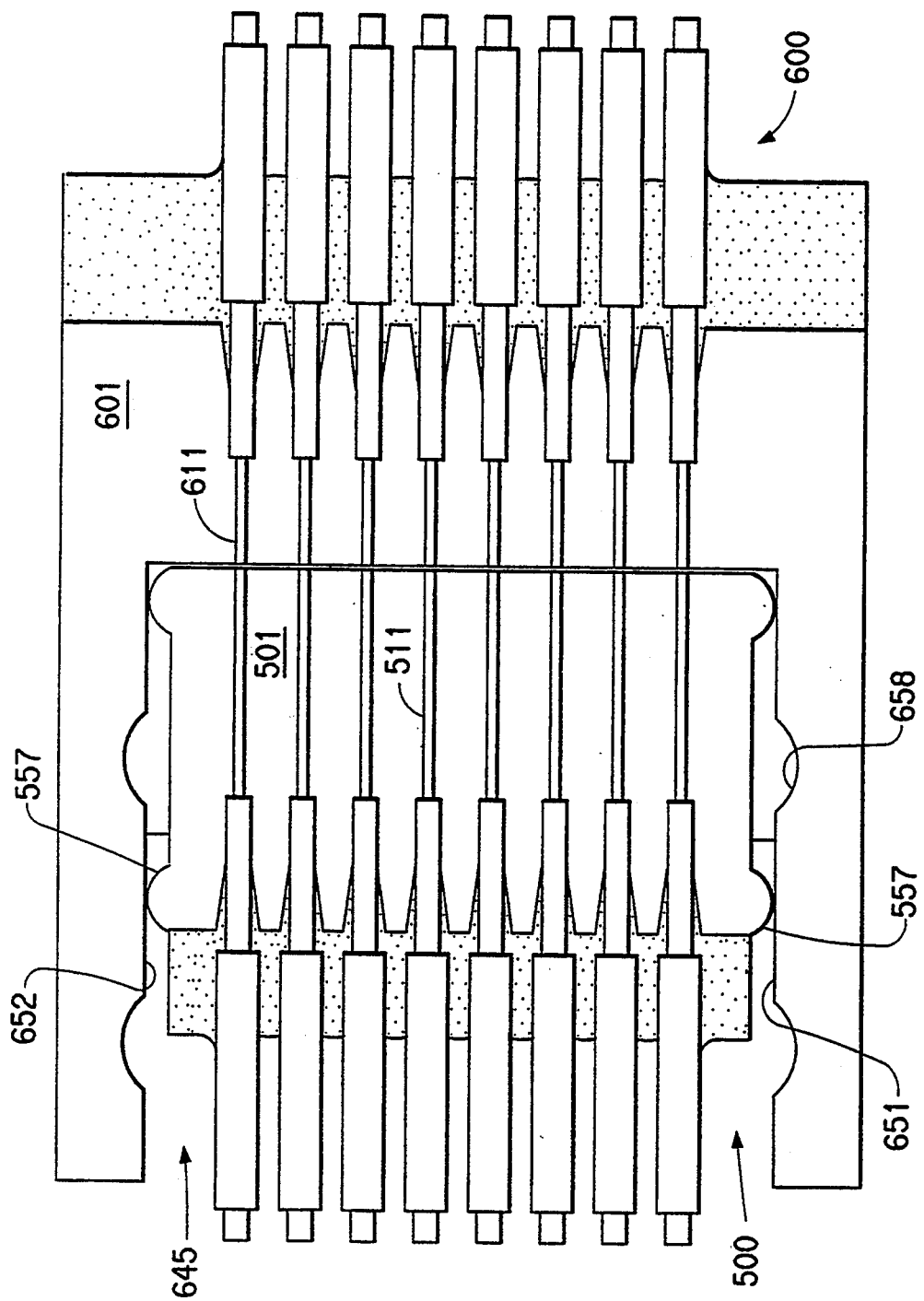
FIG. 5B is a cross sectional view of the third embodiment of the optical waveguide coupling assembly depicted in FIG. 5A with the fifth optical connector in a mated position with respect to the sixth optical connector.

FIG. 5B is a cross sectional view of the third embodiment of the optical waveguide coupling assembly depicted in FIG. 5A with the fifth optical connector 500 almost in its fully inserted mated position with respect to the sixth optical connector 600. As this view shows, the projections 557 and indentations 658 can be made so that when the strip 555 is removed and the fifth optical connector 500 is fully inserted into its mated position with respect to the sixth optical connector 600, then the projections 557 contact the third wall 651 and the fourth wall 652 thereby aligning the waveguides 511 with the waveguides 611. Preferably, the projections 557 have curved or rounded surfaces which help guide the fifth connector 500 when inserting it into the recess 645 of the sixth connector 600.

Figure 6:
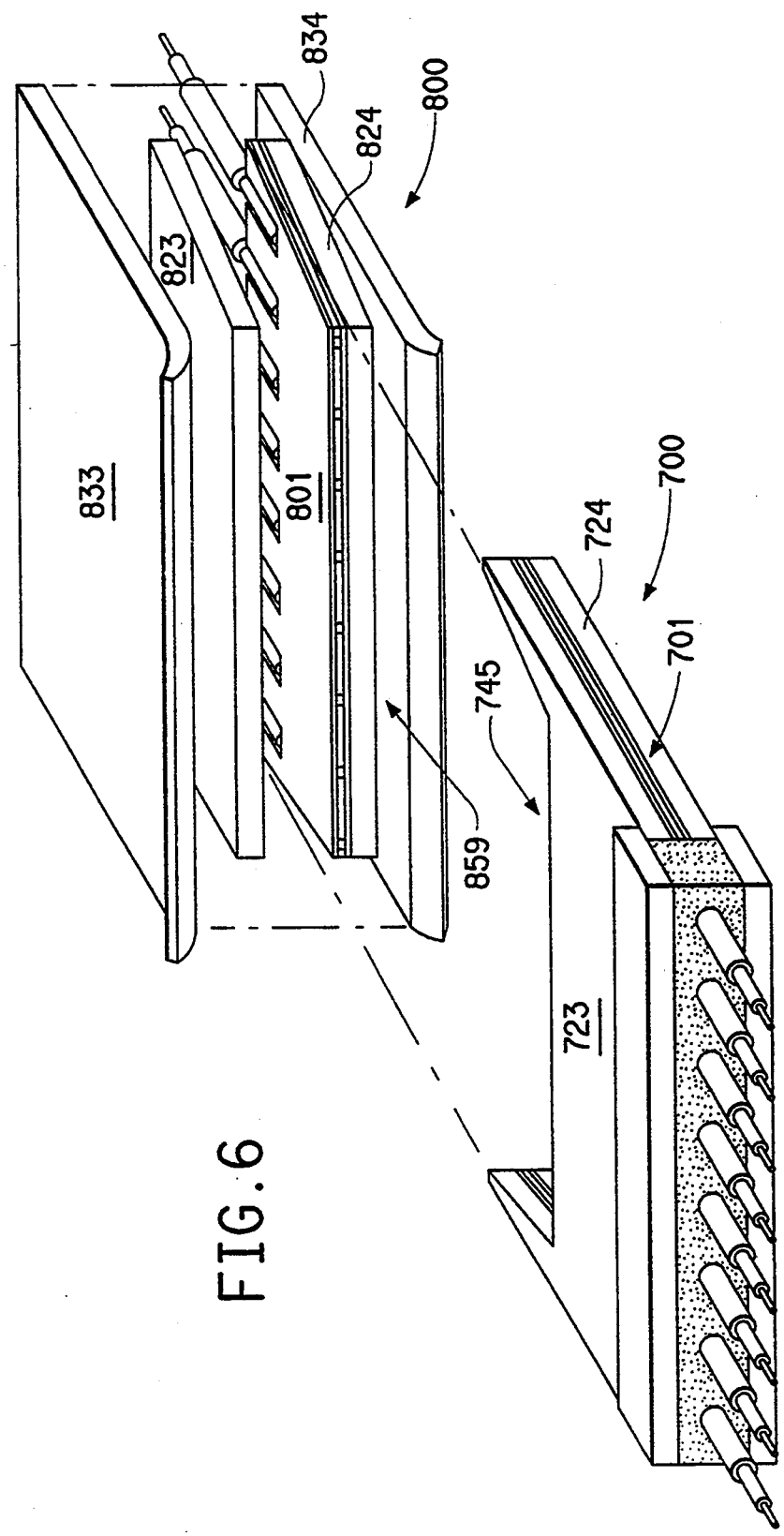
FIG. 6 is a perspective view of a fourth embodiment of an optical waveguide coupling assembly comprising a seventh optical waveguide connector with a keystone shaped slot matable with an eighth optical waveguide connector with a keystone shaped waveguide device in accordance with the present invention.

FIG. 6 illustrates a fourth optical waveguide coupling assembly in accordance with the present invention. The fourth optical waveguide coupling assembly comprises a seventh optical waveguide connector 700 matable with an eighth optical waveguide connector 800.

The seventh optical waveguide connector 700 and the eighth optical waveguide connector 800 are the same as the third connector 300 and the fourth connector 400, respectively, with the following exceptions. First, in the seventh connector 700, the first wall 723, the second wall 724, and the device 701 are the same as the first wall 423, the second wall 424, and the optical waveguide device 401 defining a keystone shaped slot 445 in the fourth connector 400. Further, in the eighth connector 800, the first wall 823, the second wall 824, and the device 801 are the same as the first wall 323, the second wall 324, and the keystone shaped optical waveguide device 301 in the third connector 300. As a result, the seventh optical waveguide connector 700 is a receptacle and the eighth optical waveguide connector 800 is a header. The eighth optical waveguide header 800 has its first wall 823, its keystone shaped optical waveguide device 801 and its second wall 824 sandwiched between its third and fourth walls 833,834 such that a recess 859 is defined by the third wall 833, the first wall 823, the eighth device 801, the second wall 824 and the fourth wall 834. The recess 859 is for receiving in a friction fit manner an end of the seventh connector 700.

Figure 7:
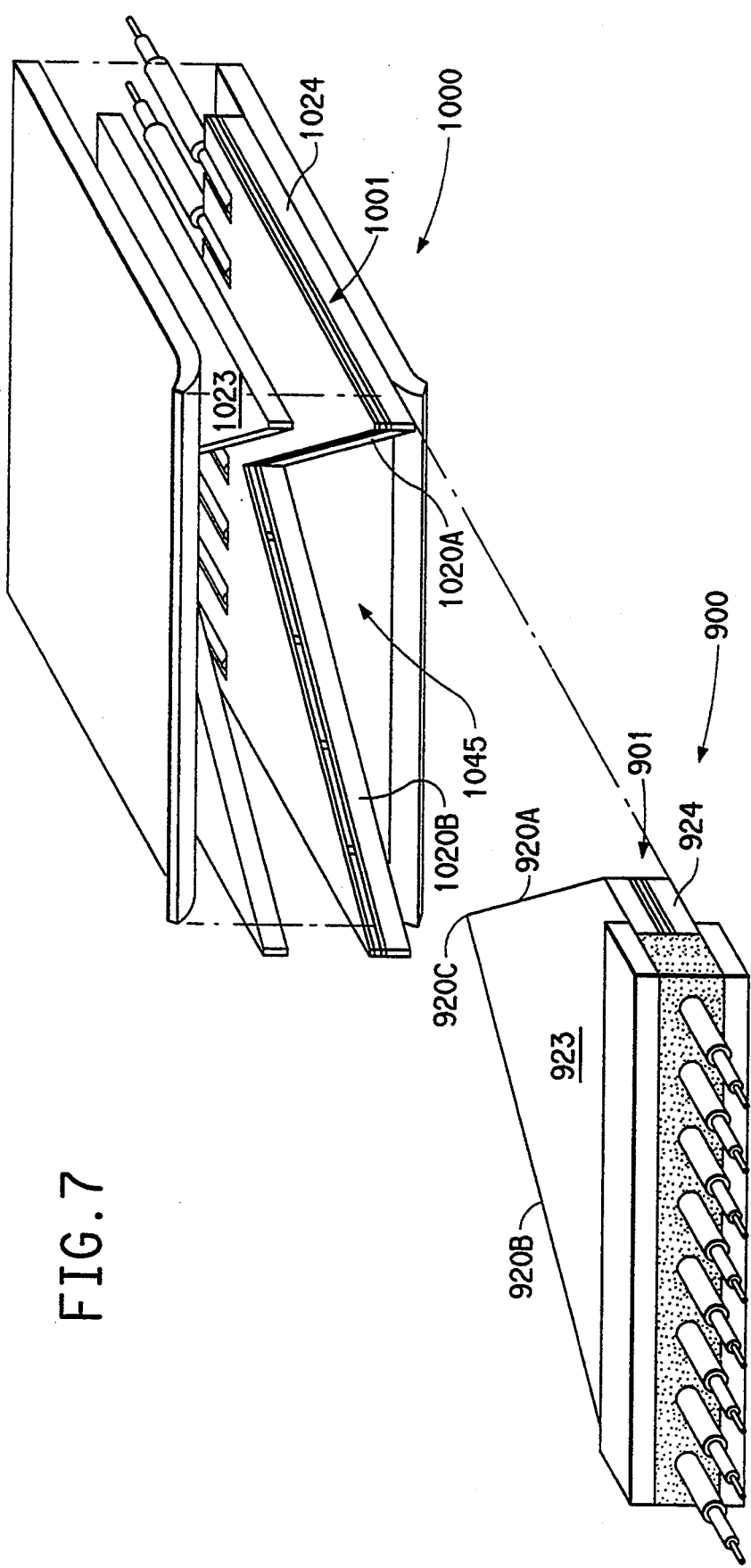
FIG. 7 is a perspective view of a fifth embodiment of an optical waveguide coupling assembly comprising a ninth triangular shaped optical waveguide connector matable with a tenth optical waveguide connector with a triangular shaped slot in accordance with the present invention.

FIG. 7 illustrates a fifth optical waveguide coupling assembly in accordance with the present invention. The fifth optical waveguide coupling assembly comprises a ninth optical waveguide connector 900 matable with a tenth optical waveguide connector 1000.

The ninth optical waveguide connector 900 is the same as the first optical waveguide connector 100, except the shape of the first wall 923, the second wall 924 and the ninth optical waveguide device 901 differs from the shape of the first wall 123, the second wall 124 and the first optical waveguide device 101. In the ninth connector 900, the first edge 920 has a part 920A and a part 920B and is V shaped with an apex 920C of the V pointing towards and for insertion in a mating V shaped slot 1045 in the tenth connector 1000. In the tenth connector 1000, the first edge 1020 has a part 1020A and a part 1020B which define the V shaped slot 1045.

FIG. 8 is an edge or side view of the fifth embodiment of the triangular shaped optical waveguide coupling assembly of FIG. 7. FIG. 9 is a cross sectional view taken generally along line 9—9 in FIG. 8 in the direction of the arrows. FIG. 9 illustrates that during the cutting step it may be necessary to extend cut paths 954 into the device 1001 to allow the apex 920C to fully insert into the slot 1045.

Figure 10:
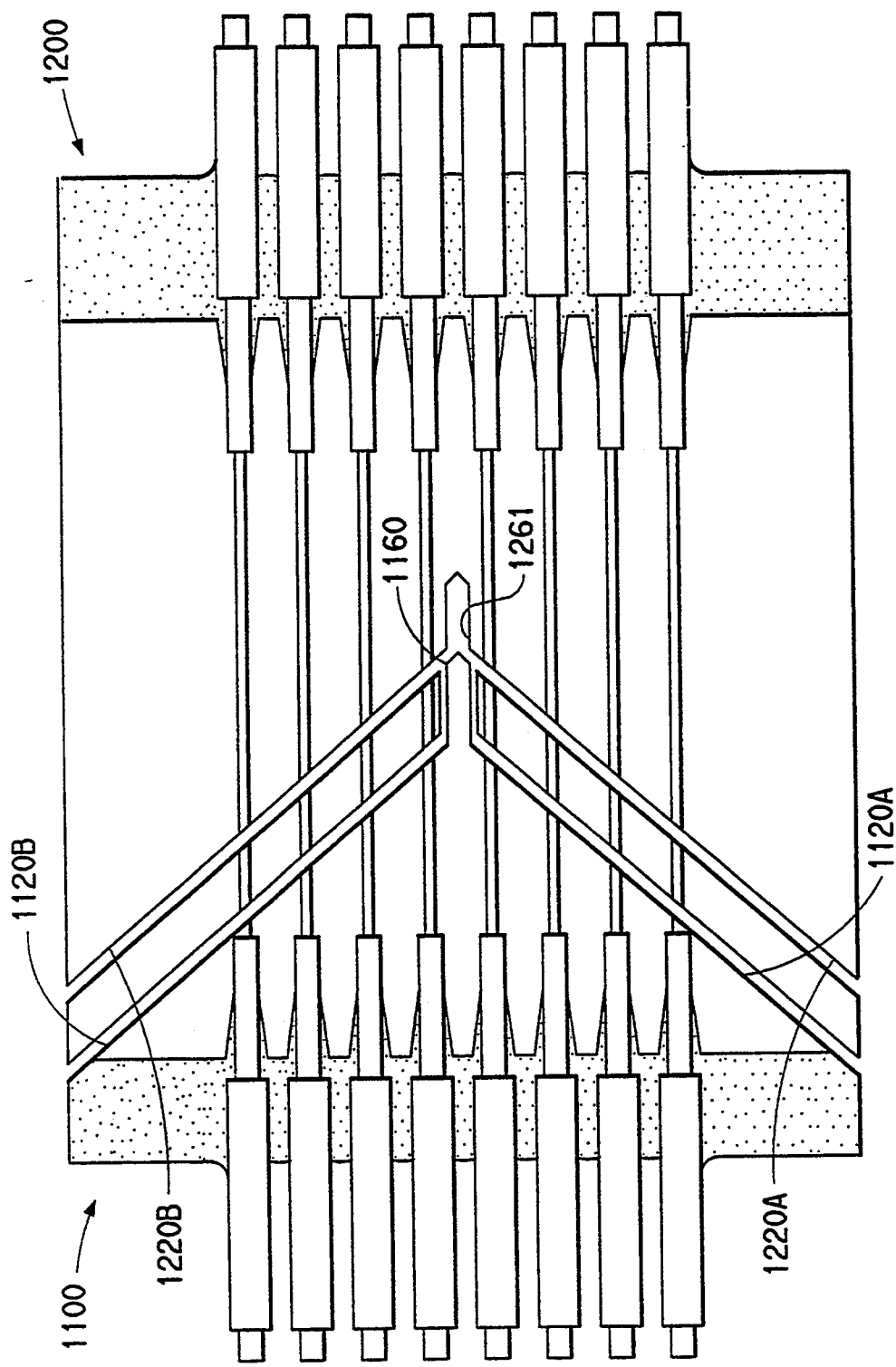
FIG. 10 is a cross sectional view, like FIG. 9, illustrating a sixth embodiment of a triangular shaped optical waveguide coupling assembly comprising an eleventh triangular shaped optical waveguide connector matable with a twelfth optical waveguide connector, the assembly with a protrusion and mating recess alignment mechanism.

FIG. 10 is a view similar to FIG. 9 and illustrates a cross section of a sixth optical waveguide coupling assembly in accordance with the present invention. The sixth optical waveguide coupling assembly comprises an eleventh optical waveguide connector 1100 matable with a twelfth optical waveguide connector 1200.

The eleventh optical waveguide connector 1100 and the twelfth optical waveguide connector 1200 are the same as the ninth connector 900 and the tenth connector 1000, respectively, with the following exceptions. In the eleventh connector 1100, the first wall 1123, the second wall 1124 and the eleventh V shaped optical waveguide device 1101 includes a protrusion 1160 in the first edge 1120A, 1120B for insertion in a mating recess 1261 in the first edge 1220A, 1220B of the twelfth connector 1200. In the twelfth connector 1200, the first wall 1223, the second wall 1224 and the twelfth device 1201 includes the recess 1261 in its first edge 1220A, 1220B for receiving the mating protrusion 1160. The protrusion 1160 and mating recess 1261 act to guide the connectors 1100,1200 to their fully mated position and, as such, are part of the third aligning means of the connectors 1100,1200.

Alternatively, the protrusion 1160 can be a pin held in a bore in the connector 1100. In FIG. 10, the protrusion 1160 is shown at the apex of the V shaped first edge 1120. However, the protrusion 1160 can be anywhere along the first edge 1120A, 1120B as long as the mating recess 1261 is similarly relocated along the first edge 1220A, 1220B. Note further that the protrusion 1160 can be on the first edge of either connector 1100 or connector 1200. Similar protrusions and mating recesses can be on any of the connector assemblies disclosed herein.

Figure 11:
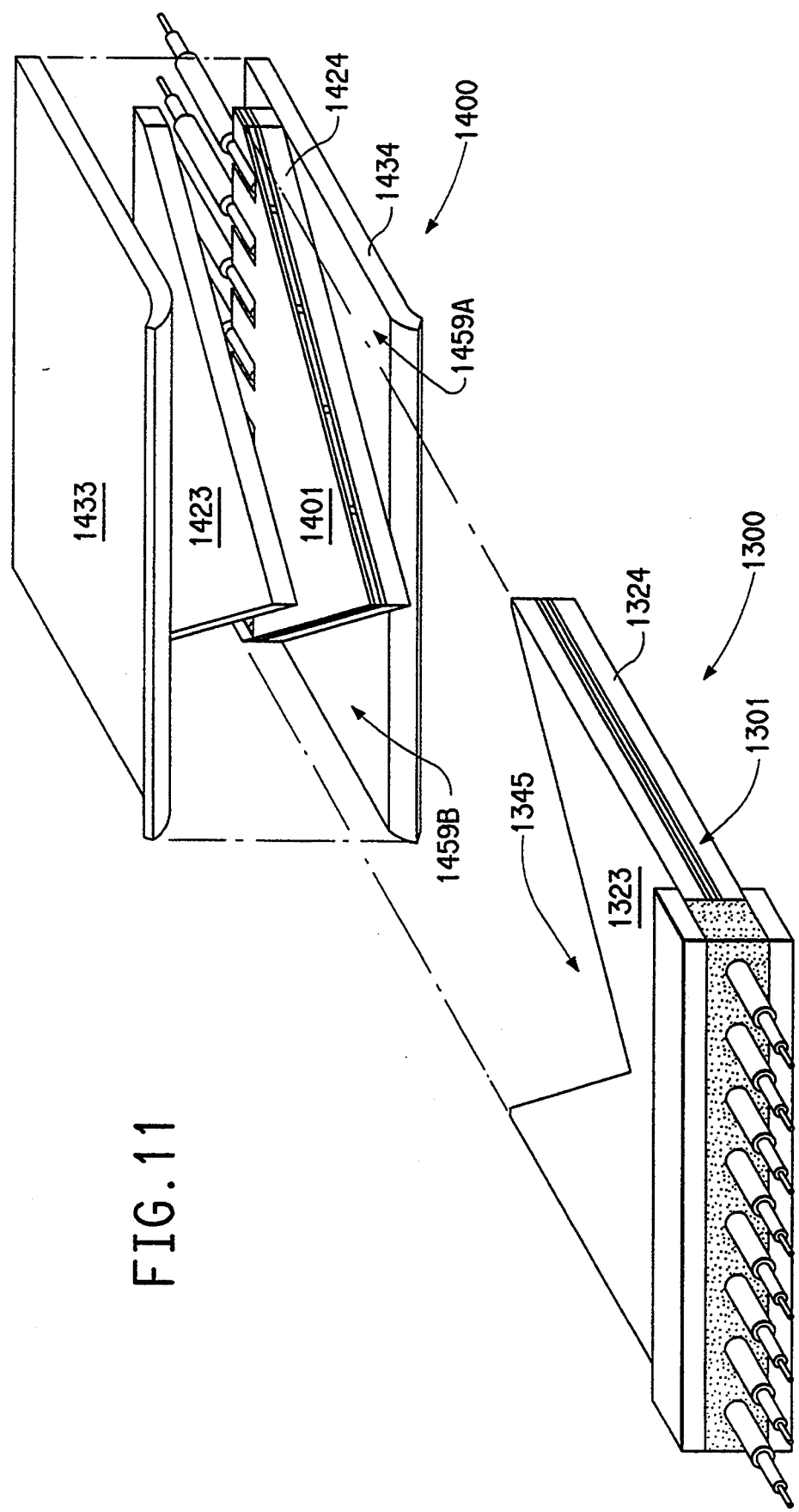
FIG. 11 is a perspective view of a seventh embodiment of an optical waveguide coupling assembly comprising a thirteenth optical waveguide connector with a triangular shaped slot matable with a fourteenth triangular shaped optical waveguide connector in accordance with the present invention.

FIG. 11 illustrates a seventh optical waveguide coupling assembly in accordance with the present invention. The seventh optical waveguide coupling assembly comprises a thirteenth optical waveguide connector 1300 matable with a fourteenth optical waveguide connector 1400. The thirteenth optical waveguide connector 1300 and the fourteenth optical waveguide connector 1400 are the same as the ninth connector 900 and the tenth connector 1000, respectively, except (1) the first wall 1323, the second wall 1324 and the thirteenth device 1301 are the same as the first wall 1023, the second wall 1024 and the optical waveguide device 1001 defining the V shaped slot 1045 in the tenth connector 1000 and (2) the first wall 1423, the second wall 1424 and the fourteenth device 1401 are the same as the first wall 923, the second wall 924 and the V shaped optical waveguide device 901 that is in the ninth connector 900. By exchanging these parts in the thirteenth and fourteenth connectors 1300,1400 in comparison to the ninth and tenth connectors 900,1000, the thirteenth optical waveguide connector 1300 becomes a receptacle and the fourteenth optical waveguide connector 1400 becomes a header. The fourteenth optical waveguide header 1400 has its first wall 1423, its V shaped optical waveguide device 1401 and its second wall 1424 sandwiched between its third and fourth walls 1433,1434 such that recesses 1459A, 1459B exist defined by the third wall 1433, the first wall 1423, the V shaped optical waveguide device 1401, the second wall 1424 and the fourth wall 1423. The recesses 1459A, 1459B are for receiving in a friction fit manner an end of the thirteenth connector 1300.

Figure 12:
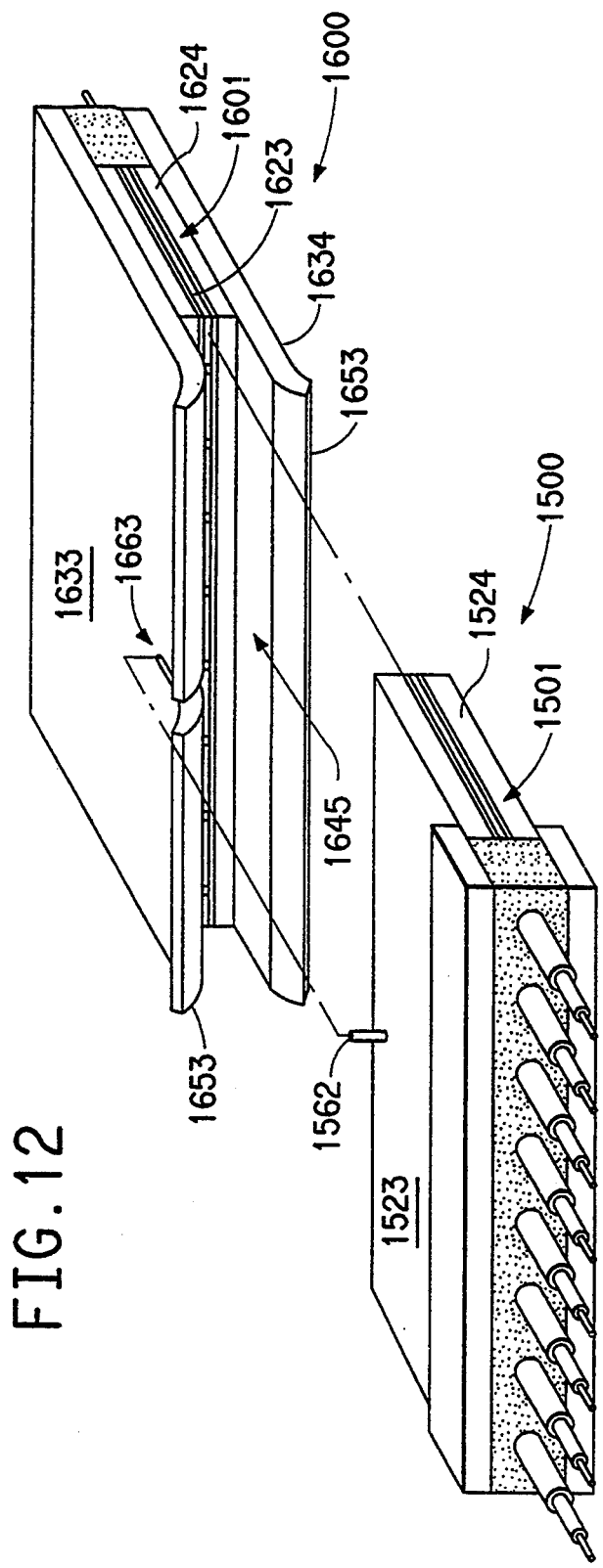
FIG. 12 is a perspective view of an eighth embodiment of an optical waveguide coupling assembly comprising a fifteenth optical waveguide connector matable with a sixteenth optical waveguide connector, the assembly illustrating a pin and slot lateral alignment mechanism in accordance with the present invention.

FIG. 12 illustrates an eighth optical waveguide coupling assembly in accordance with the present invention. The eighth optical waveguide coupling assembly comprises a fifteenth optical waveguide connector 1500 matable with a sixteenth optical waveguide connector 1600. The fifteenth optical waveguide connector 1500 is a header. The sixteenth optical waveguide connector 1600 is a receptacle.

The fifteenth optical waveguide connector 1500 is the same as the first optical waveguide connector 100, except the third aligning means of the fifteenth connector 1500 further comprises an alignment peg 1562 mounted on the first wall 1523 (or elsewhere on the fifteenth connector 1500).

The sixteenth optical waveguide connector 1600 is the same as the second optical waveguide connector 200, except the third aligning means of the sixteenth connector 1600 further comprises an alignment slot 1663 in its third wall 1633 for receiving the alignment peg 1562. It should be understood that any of the connectors disclosed herein with its third and fourth walls partially defining a slot which performs the function of slot 1645 could include as part of its third aligning means an alignment slot similar to slot 1663 in its third or fourth wall for receiving an alignment peg similar to peg 1562 on its mating connector. Also in contrast to the second connector 200, the third and fourth walls 1633,1634 of the sixteenth optical waveguide connector 1600 can have diverging end portions 1653 as part of its third aligning means.

Figure 13:
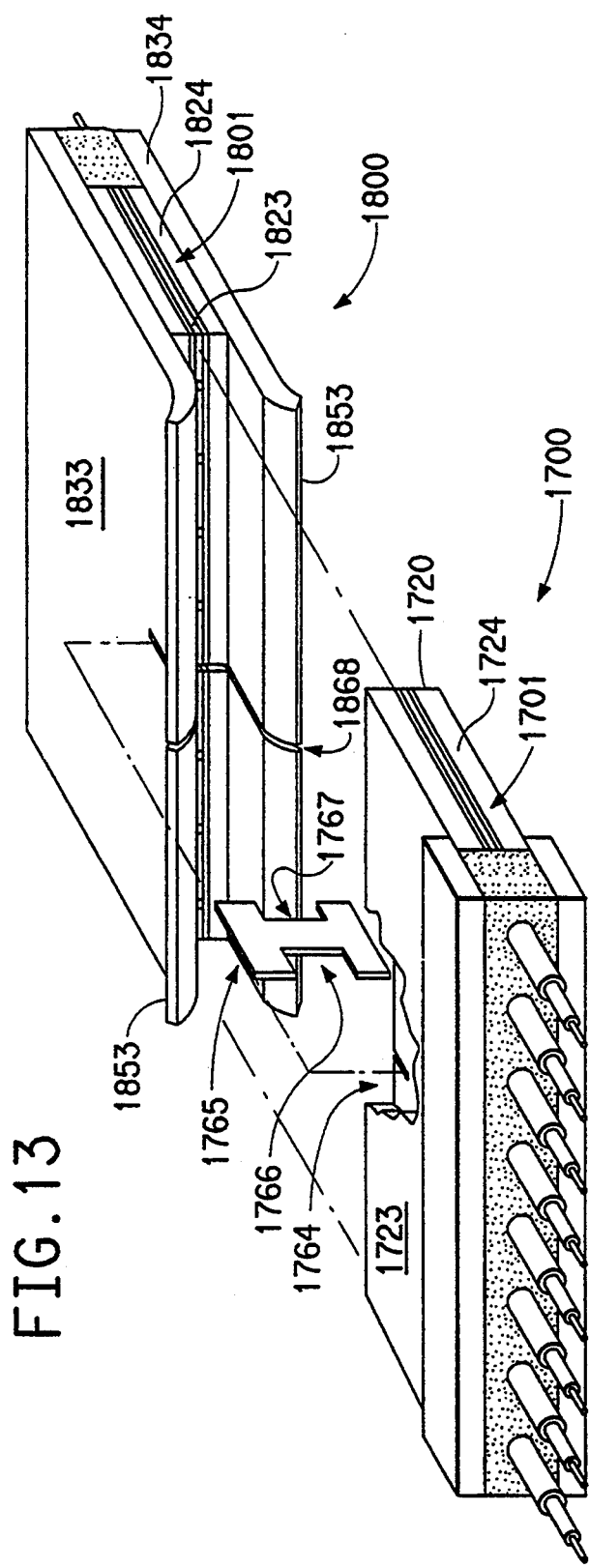
FIG. 13 is a perspective view of a ninth embodiment of an optical waveguide coupling assembly including a seventeenth optical waveguide connector matable with an eighteenth optical waveguide connector, the assembly illustrating an H shaped slot lateral alignment coupler in accordance with the present invention.

FIG. 13 illustrates a ninth optical waveguide coupling assembly in accordance with the present invention. The ninth optical waveguide coupling assembly comprises a seventeenth optical waveguide connector 1700 matable with an eighteenth optical waveguide connector 1800. The seventeenth optical waveguide connector 1700 is a header. The eighteenth optical waveguide connector 1800 is a receptacle.

The seventeenth optical waveguide connector 1700 is the same as the first optical waveguide connector 100, except the third aligning means of the seventeenth connector 1700 comprises an alignment slot 1764 in the first edge 1720 of the first wall 1723, the seventeenth optical waveguide device 1701 and the second wall 1724. The third aligning means of the seventeenth connector 1700 further comprises an H shaped alignment coupler 1765 having a first confined space 1766 and a second confined space 1767. The first confined space 1766 is pressed into the alignment slot 1764 in the seventeenth connector 1700 until a central portion of the H shaped alignment coupler sits in the slot 1764.

The eighteenth optical waveguide connector 1800 is the same as the second optical waveguide connector 200, except the third aligning means of the eighteenth connector 1800 comprises an alignment slot 1868 in the third wall 1833, the first wall 1823, the eighteenth device 1801, the second wall 1824 and the fourth wall 1834 for receiving the second confined space 1767 and the central portion of the H shaped alignment coupler 1765. It should be understood that any of the connector assemblies disclosed herein could include as part of its third aligning means alignment slots plus an H shaped alignment coupler as illustrated in FIG. 13. As in the eighteenth connector 1800, it may also be necessary for the third wall 1833 and the fourth wall 1834 to have alignment slots 1868 to allow insertion of the H shaped alignment coupler 1765. However, the alignment slots 1868 in the third wall 1833 and the fourth wall 1834 can be wider than the thickness of the coupler 1765 therefore providing mere clearance or guidance for the coupler 1765, rather than aiding in the aligning process. Also in contrast to the second connector 200, the third and fourth walls 1833,1834 of the eighteenth optical waveguide connector 1800 have diverging end portions 1853 as part of its third aligning means.

Figure 14:
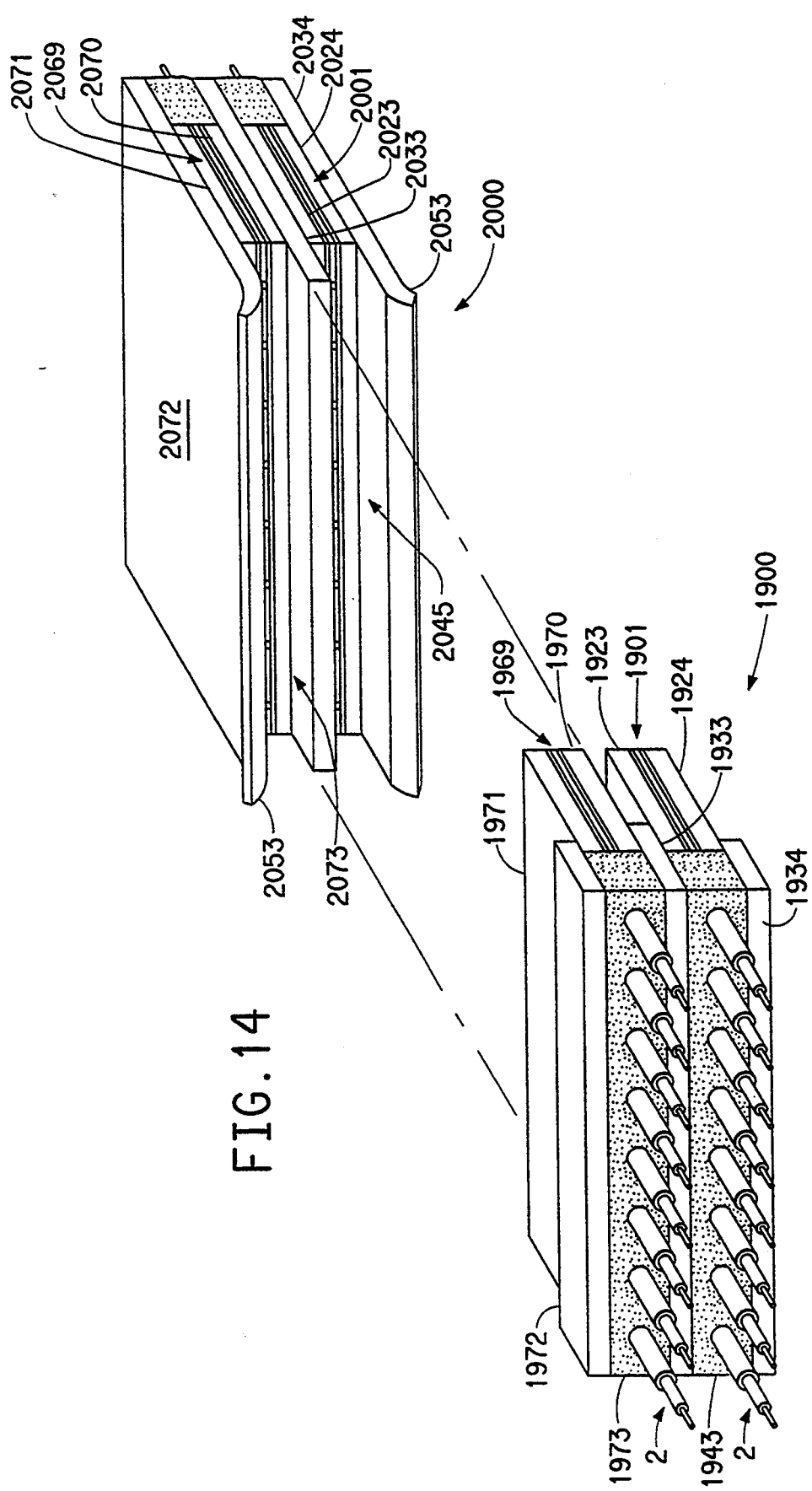
FIG. 14 is a perspective view of an tenth embodiment of an optical waveguide coupling assembly including a nineteenth optical waveguide connector matable with a twentieth optical waveguide connector, the assembly comprising a stacked optical waveguide header matable with a stacked optical waveguide receptacle in accordance with the present invention.

FIG. 14 illustrates a tenth optical waveguide coupling assembly in accordance with the present invention. The tenth optical waveguide coupling assembly comprises a nineteenth optical waveguide connector 1900 matable with a twentieth optical waveguide connector 2000. The nineteenth optical waveguide connector 1900 is a header. The twentieth optical waveguide connector 1200 is a receptacle.

The nineteenth optical waveguide connector 1900 is the same as the first optical waveguide connector 100, except it includes a first stacked optical waveguide device 1969, a fifth wall 1970, a sixth wall 1971 and an optional seventh wall 1972.

The first stacked optical waveguide device 1969 can, but need not, be just like the first optical waveguide device 101 in the first connector 100.

The fifth wall 1970 has a first edge, a second edge, a first side and a second side. The first side of the fifth wall 1970 is adhered to the second side of the third wall 1933. The second side of the fifth wall 1970 is adhered to the second side of the first element of the stacked device 1969.

The sixth wall 1971 has a first edge, a second edge, a first side and a second side. The first side of the sixth wall 1971 is adhered to the second side of the second element of the stacked device 1969.

The seventh optional wall 1972 has a first edge, a second edge, a first side and a second side. The first side of the seventh wall 1972 is adhered to the second side of the sixth wall 1971. As described in relation to the first connector 100, the fourth and seventh walls 1934,1972 can be removed after the filler 1943,1973 is applied and hardened.

The first means includes fifth means for mechanically coupling and optically aligning first ends of the first waveguides in the first stacked device 1969 to corresponding ends of waveguides in the stacked device 1969 in the twentieth connector 2000. The fifth means in the nineteenth connector 1900 can be a repeat of the same arrangement as the first mechanically coupling and optically aligning means in the first connector 100. Alternatively, the fifth means in the nineteenth connector 1900 can be any of the alternatives disclosed herein or equivalents thereof.

The second means includes sixth means for mechanically coupling and optically aligning second ends of the waveguides in the first stacked device 1969 (i) to corresponding ends of waveguides in a third optical waveguide device or (ii) to corresponding optical fibers 2.

The twentieth optical waveguide connector 2000 is the same as the second optical waveguide connector 200, except it includes a second stacked optical waveguide device 2069, a fifth wall 2070, a sixth wall 2071 and a seventh wall 2072.

The second stacked optical waveguide device 2069 can, but need not, be just like the device 101 in the first connector 100.

The fifth wall 2070 has a first edge, a second edge, a first side and a second side. The first side of the fifth wall 2070 is adhered to the second side of the third wall 2033. The second side of the fifth wall 2070 is adhered to the second side of the first element of the stacked device 2069.

The sixth wall 2071 has a first edge, a second edge, a first side and a second side. The first side of the sixth wall 2071 is adhered to the second side of the second element of the stacked device 2069.

The seventh wall 2072 has a first edge, a second edge, a first side and a second side. The first side of the seventh wall 2072 is adhered to the second side of the sixth wall 2071. The third wall 2033, the fifth wall 2070, the stacked device 2069, the sixth wall 2071 and the seventh wall 2072 define a second slot 2073 for receiving in a friction fit manner an end portion of the fifth wall 1970, the first stacked device 1969, and the sixth wall 1971 of the nineteenth connector 1900.

The first means includes fifth means for mechanically coupling and optically aligning first ends of the waveguides in the stacked device 2069 to corresponding ends of waveguides in the stacked device 1969 in the nineteenth connector 1900. The fifth means in the twentieth connector 2000 can be a repeat of the same arrangement as the first mechanically coupling and optically aligning means in the second connector 200. Alternatively, the fifth means in the twentieth connector 2000 can be any of the alternatives disclosed herein or equivalents thereof. Additional stacked optical waveguide devices and walls can be added to the connectors illustrated in any of the Figures including FIG. 14 in the same manner that stacked optical waveguide devices and additional walls were added to create the nineteenth and twentieth connectors 1900,2000.

Note that the third aligning means in the twentieth connector 2000 has end portions 2053 on its fourth and seventh walls 2034,2072 which diverge from one another such that they guide the ends of the first and stacked optical waveguide devices 1901,1969 into their fully mated position in slots 2045,2073, respectively. Whereas, sides of the wall 2033 are planar where it defines the slots 2045,2073.

The second means includes sixth means for mechanically coupling and optically aligning second ends of the second waveguides in the stacked device 2069 (i) to corresponding ends of third waveguides in a third optical waveguide device or (ii) to corresponding optical fibers 2.

Figure 15:
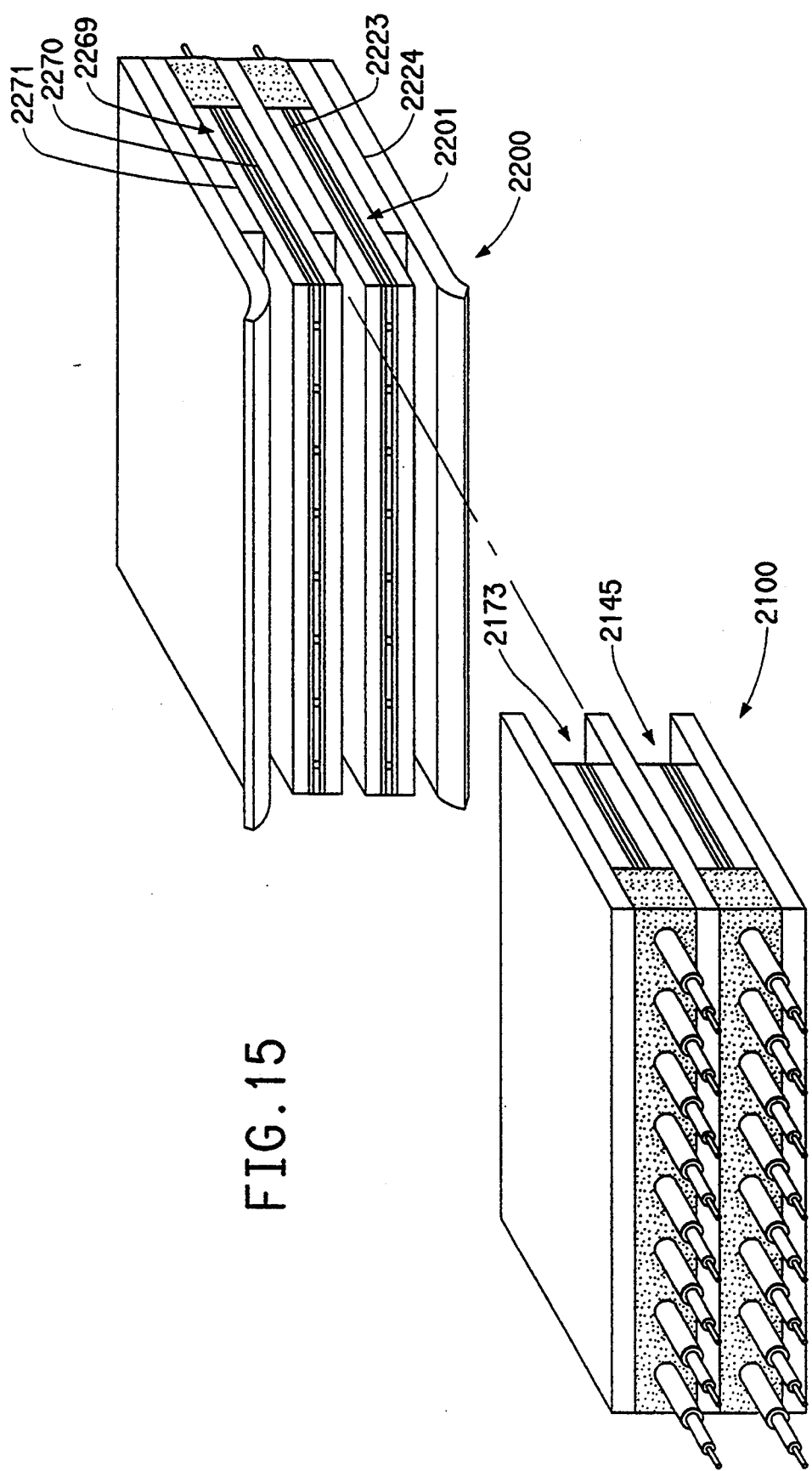
FIG. 15 is a perspective view of an eleventh embodiment of an optical waveguide coupling assembly including a twenty-first optical waveguide connector matable with an twenty-second optical waveguide connector, the assembly comprising a stacked optical waveguide header matable with a stacked optical waveguide receptacle in accordance with the present invention.

FIG. 15 illustrates an eleventh optical waveguide coupling assembly in accordance with the present invention. The eleventh optical waveguide coupling assembly comprises a twenty-first optical waveguide connector 2100 matable with a twenty-second optical waveguide connector 2200.

The twenty-first optical waveguide connector 2100 and the twenty-second optical waveguide connector 2200 are the same as the nineteenth connector 1900 and the twentieth connector 2000, respectively, except (1) the twenty-first connector 2100 has first and second slots 2145,2173 (like the slots 2045,2073 in the twentieth connector 2000) which makes the twenty-first connector 2100 a receptacle and (2) the twenty-second connector 2200 has exposed end portions on its first wall 2223 and second wall 2224 sandwiching its first device 2201 and on its fifth wall 2270 and its sixth wall 2271 sandwiching its stacked device 2269 (like the exposed end portion on the first wall 1923 and the second wall 1924 sandwiching the device 1901 and the exposed end portion on the fifth wall 1970 and the sixth wall 1971 sandwiching the stacked device 1969). This makes the twenty-second connector 2200 a header. The exposed end portions of the connector 2200 are for insertion with an interference fit into the first and second slots 2145,2173 in connector 2100.

All walls used in the connectors illustrated in FIGS. 14 and 15 can be made from the same materials as the walls in the first connector 100. Further, all walls used in the connectors illustrated in FIGS. 14 and 15 can be made the same or different thicknesses.

Figure 16:
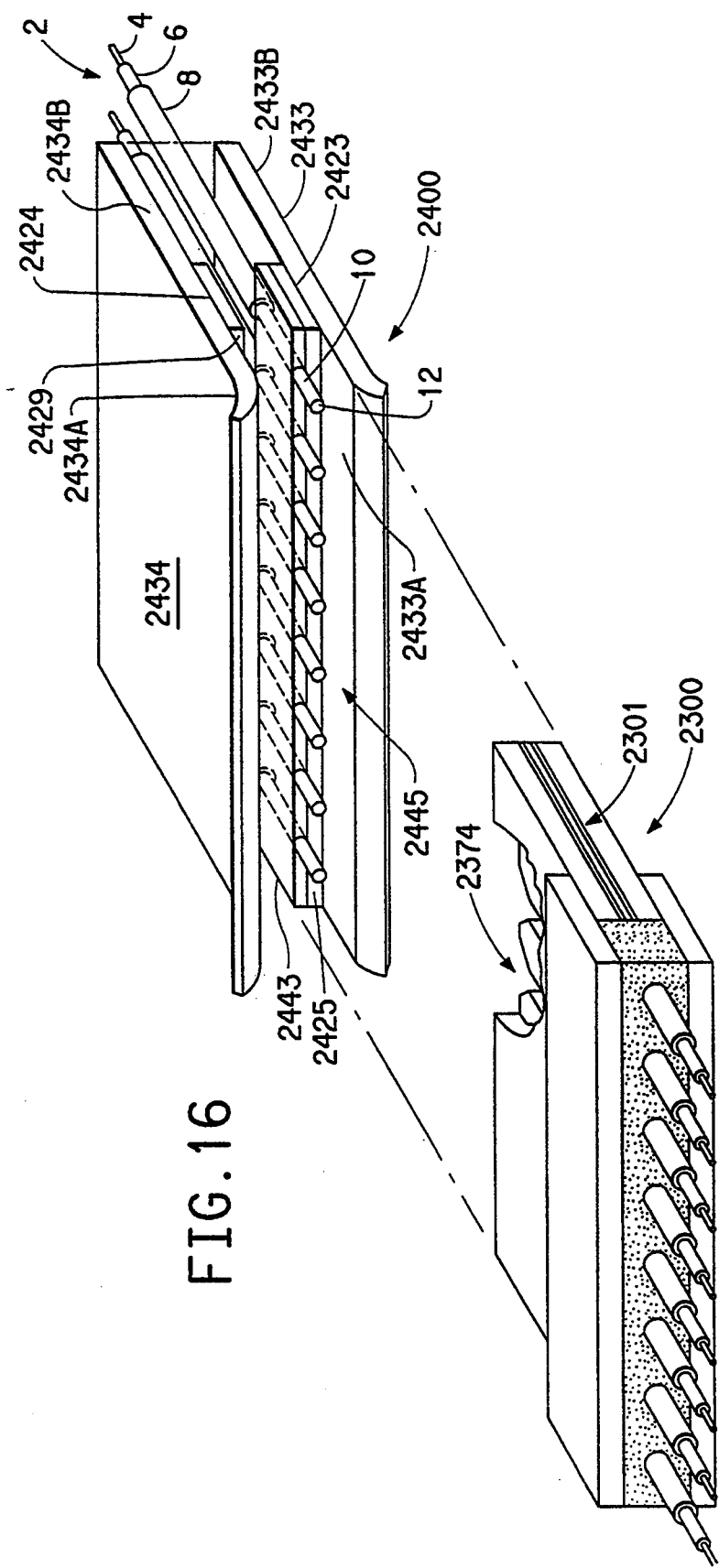
FIG. 16 is a perspective view of a twelfth embodiment of an optical waveguide coupling assembly including a twenty-third optical waveguide connector matable with a twenty-fourth optical waveguide connector, the assembly comprising an optical waveguide header matable with an optical waveguide receptacle in accordance with the present invention.

FIG. 16 illustrates a twelfth optical waveguide coupling assembly in accordance with the present invention. The twelfth optical waveguide coupling assembly comprises a twenty-third optical waveguide connector 2300 matable with a twenty-fourth optical waveguide connector 2400. FIG. 17 is a cross sectional view of the twelfth embodiment of the optical waveguide coupling assembly of FIG. 16 taken generally along line 17—17 in FIG. 18 in the direction of the arrows. FIG. 18 is a cross sectional view taken generally along line 18—18 in FIG. 17 in the direction of the arrows.

The twenty-third connector 2300 is the same as the first connector 100, except the third aligning means includes recesses 2374 in the first edge of the device 2301 for receiving ends 12 of optical fibers 2.

The twenty-fourth connector 2400 includes a first plurality of the optical fibers 2, a first wall 2423, a second wall 2424, a third wall 2433, a fourth wall 2434, and photohardened filler 2443.

The first wall 2423 has a first edge 2425, a second edge 2426, a first side and a second side. First end portions 10 of the first plurality of optical fibers 2 without the jacket 8 are positioned parallel or substantially parallel to one another on the first side of the first wall 2423 such that the first ends 12 extend from or to the first edge 2425.

The second wall 2424 has a first edge 2429, a second edge 2430, a first side and a second side. The first side of the second wall 2424 is on the first end portions 10 of the first plurality of optical fibers 2.

The third wall 2433 has a first edge 2429, a second edge, a first side and a second side. The first side of the third wall 2433 is adhered to the second side of the first wall 2423. The third wall 2433 has a first portion 2433A and a second portion 2433B. The first portion 2433A extends beyond the first edges 2425,2429 of the first and second walls 2423,2424. The second portion 2433B extends beyond the second edge 2426,2430 of the first and second walls 2433,2434.

The fourth wall 2434 has a first edge, a second edge, a first side and a second side. The first side of the fourth wall 2434 is adhered to the second side of the second wall 2424. The fourth wall 2434 has a first portion 2434A and a second portion 2434B. The first portion 2434A extends beyond the first edge 2429 of the second wall. The second portion 2434B extends beyond the second edge 2430 of the second wall 2424.

The first plurality of optical fibers 2 with jackets 8 extend between the third wall second portion 2433B and the fourth wall second portion 2434B.

The photohardened filler 2443 is between the first wall 2423, the second wall 2424 and the first end portions 10 of the first plurality of optical fibers 2. As seen in FIGS. 17 and 18, the filler 2443 is also between the third wall second portion 2433B, the fourth wall second portion 2434B and the first plurality of optical fibers 2.

The first wall 2423, the second wall 2424, the third wall 2433, and the fourth wall 2434 define a slot 2445 for mechanically coupling the first ends 12 of the optical fibers 2 to corresponding ends of the plurality of waveguides in the connector 2300 or other optical fibers.

The twenty-fourth connector 2400 can also be described as having first means for mechanically coupling and optically aligning a first end of the first plurality of optical fibers (i) to a corresponding end of the third optical waveguide device 2301 or (ii) to a corresponding second plurality of optical fibers. The slot 2445 comprises part of the first means which receives the end of the connector 2300 in a friction fit manner. This first means on the twenty-fourth connector 2400 can be the same or include similar elements as the first means on any of the other connectors disclosed herein.

Figure 20:
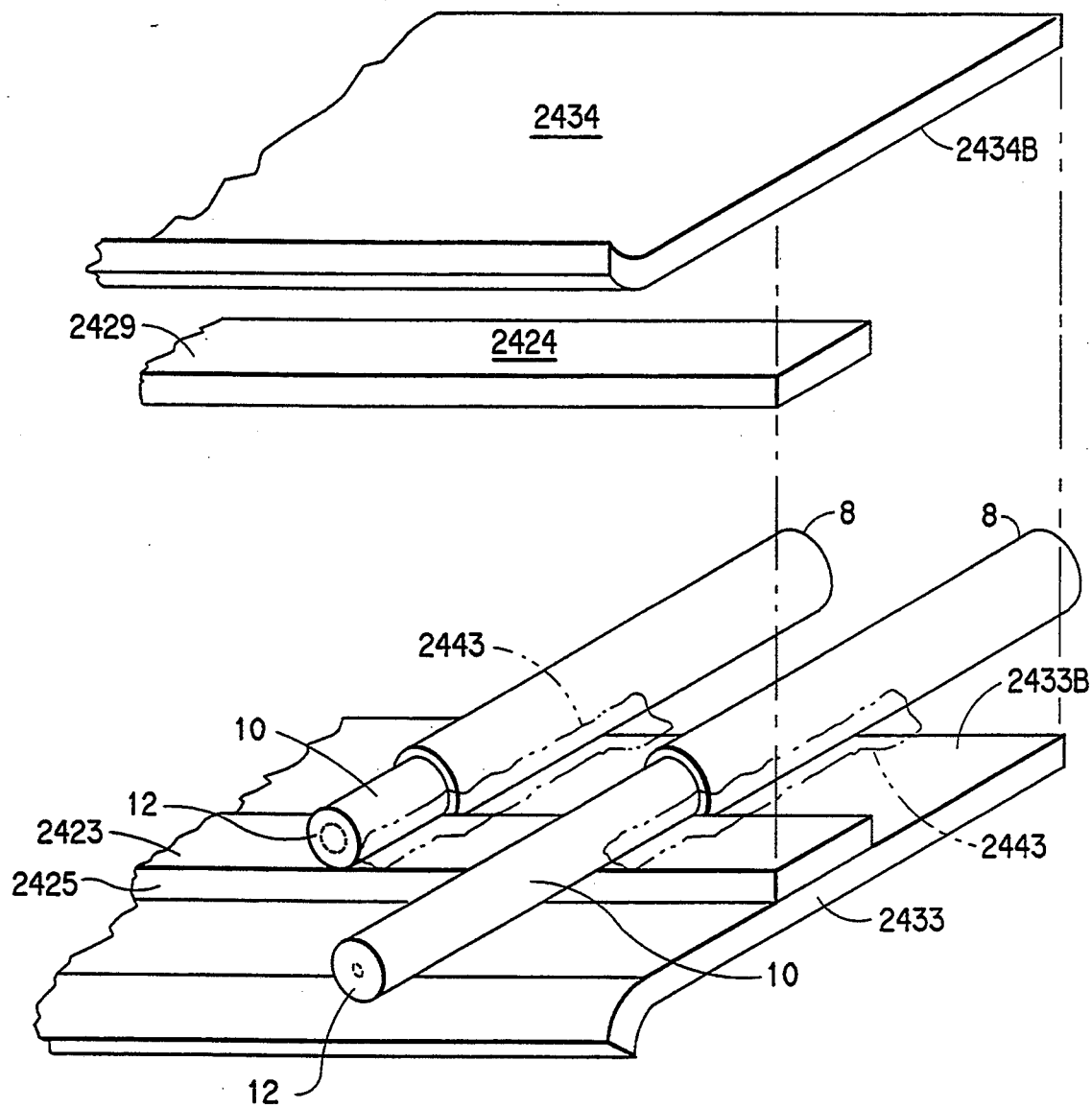
FIG. 20 is a perspective view illustrating further manufacturing steps in forming the twenty-fourth connector in the optical waveguide coupling assembly of FIG. 16 with parts exploded from one another.
Figure 21:
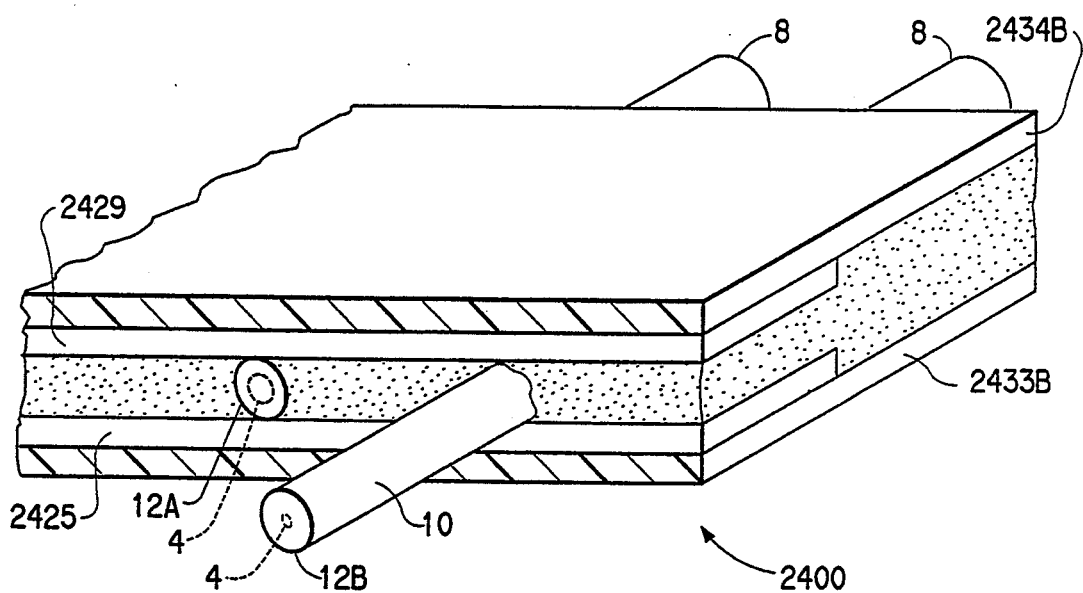
FIG. 21 is a perspective view illustrating a final manufacturing step in forming the twenty-fourth connector in the optical waveguide coupling assembly of FIG. 16.

A substantially dry method for making the optical waveguide connector 2400 is illustrated in FIGS. 19–21. The first step of the method comprises adhering the first side of the first wall 2423 to the first side of the third wall 2433 such that the trailing portion 2433B of the third wall 2433 extends beyond the first wall 2423. The second step is positioning the first plurality of optical fibers 2 on the second side of the first wall 2423 by locating each optical fiber 2 in a separate groove 2475 of an alignment block 2476 with ends 12 of the optical fibers 2 near a first edge 2425 of the first wall 2423. This is illustrated in FIG. 19. The block grooves 2475 are spaced to facilitate coupling of the ends 12 of the optical fibers 2 to waveguides or optical fibers in a mating device. The third step is applying the photohardenable filler 2443 where the first wall 2423 contacts the optical fibers 2. This is illustrated in FIG. 20. Next, the photohardenable filler 2443 is hardened to secure the optical fibers 2 to the first wall 2423. Then the alignment block 2476 is removed. The next step is placing the first side of the second wall 2424 on the optical fibers 2 with the first edge 2429 of the second wall 2424 substantially in a plane with the first edge 2425 of the first wall 2423. The next step is adhering the fourth wall 2434 on the second wall second side such that the trailing portion 2434B of the fourth wall 2434 extends beyond the second wall 2424. (Alternatively, the second wall 2424 can be adhered to the fourth wall 2434 before the second wall 2424 is placed on the optical fibers 2.) Next, more photohardenable filler 2443 is applied between the second side of the first wall 2423 and the first side of the second wall 2424 and between the third wall trailing portion 2433B and the fourth wall trailing portion 2434B. Then the photohardenable filler 2443 hardened forming the optical waveguide connector 2400.

As another alternative, the first wall 2423 can, in fact be a step portion which is one piece with the third wall 2433. Similarly, the second wall 2424 can, in fact be a step portion which is one piece with the fourth wall 2434.

FIG. 21 illustrates the end 12A of one fiber 2 in the same plane as the first edges 2425,2429. This can be so when the fiber 2 is used in multimode operation. When all of the fibers 2 in the twenty-fourth connector 2400 are used in multimode operation all ends 12 can be in the same plane as the first edges 2425,2429. In such a case, the twenty-fourth connector 2400 would mate with the first connector 100 (without the slots 2374 illustrated in the twenty-third connector 2300). FIG. 21 also illustrates the end 12B of another fiber 2 extending or spaced from the plane with the first edges 2425,2429. This is so when the fiber 2 is used in single mode operation.

Figure 22:
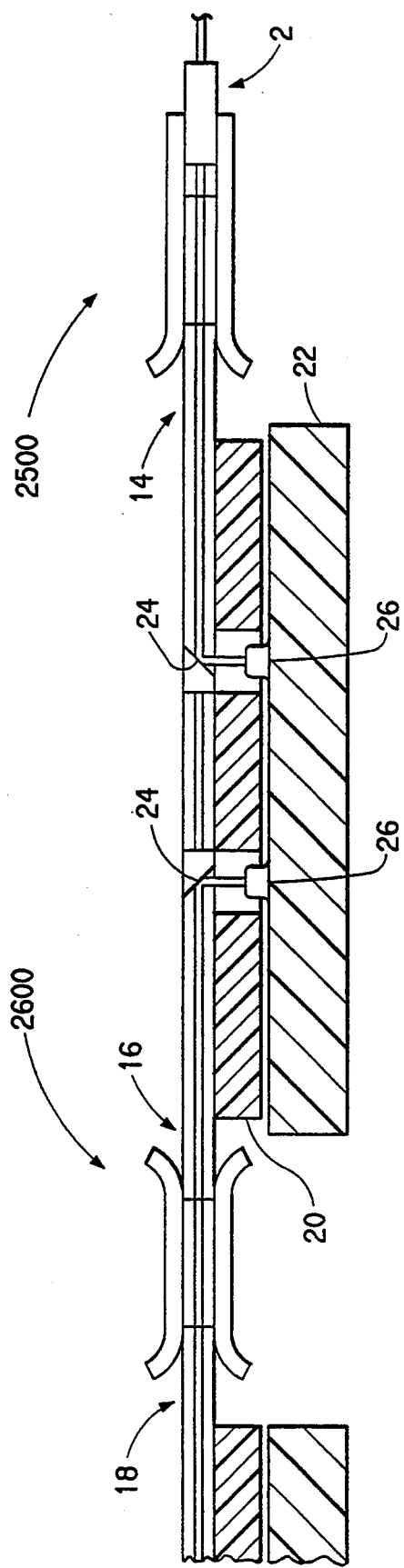
FIG. 22 is a cross sectional view illustrating use of a single tongue optical waveguide connector connecting a plurality of optical fibers to a waveguide tongue and a double tongue optical waveguide connector connecting a first waveguide tongue to a second waveguide tongue in accordance with the present invention.

FIG. 22 is a cross sectional view illustrating use of a single tongue optical waveguide connector 2500 connecting a plurality of optical fibers 2 to a first photohardened waveguide tongue 14 and a double tongue optical waveguide connector 2600 connecting a first photohardened waveguide tongue 16 to a second photohardened waveguide tongue 18 in accordance with the present invention. The single tongue optical waveguide connector 2500 can be made the same as anyone of the connectors 200, 400, 600, 800, 1000, 1200, 1400, 1600, 1800, 2000, and 2400. The double tongue optical waveguide connector 2600 can be made the same as anyone of the connectors 200, 400, 600, 800, 1000, 1200, 1400, 1600, 1800, 2000, and 2400, but both ends of the double tongue optical waveguide connector 2600 are adapted to receive one of the waveguide tongues 16,18. The waveguide tongues 14,16,18 are end portions of a photohardened waveguide device sandwiched between a first wall and a second wall such as those described throughout this disclosure. However, instead of the waveguide tongues 14,16,18 including a third wall, a fourth wall and filler, the waveguide tongues 14,16,18 can be mounted by a support 20 to a circuit assembly 22, such as a printed circuit board. Edges 24 of the waveguide tongue 14,16 can be coated with a reflective material and angled to direct light from waveguides in the tongues 14,16 through passages in the support 22 to photosensor and/or photoemitter device 26 on the circuit assembly 22.

EXAMPLE 1

A device was constructed essentially like connector 2400 as shown in FIGS. 17-21 having nine fibers 2 spaced on 300 micron centers. The fiber ends 12 were mounted flush with edge 2425. One piece molded walls 2433+2423 and 2434+2424 were fabricated in the following manner. A suitable glass mold having a mold cavity 25 millimeters long and 5 millimeters wide was used. The mold had a depth of one millimeter with a central well, corresponding to the wall 2423, that was seven millimeters long and 210 microns deep. The well was positioned so that face 2425 would be formed approximated nine millimeters from portion 2453. A suitable liquid photopolymerizable material was used to form the molded walls 2433+2423 and 2434+2424. The suitable liquid photopolymerizable material is described as Composition 2 in the following Table I.

TABLE I

| Ingredient | Comp. 1 (Weight %) | Comp. 2 (Weight %) |
| --- | --- | --- |
| Triethylene glycol dimethacrylate | 8.5 | 49.5 |
| Propoxylated neopentyiglycol diacrylate | 34 | 20 |
| Propoxylated trimethylolpropane triacrylate | 30 | 0 |
| phenol ethoxylate monacrylate | 12 | 12 |
| Aliphatic urethane acrylate oligomer | 0 | 14 |
| 3-Methacryloxypropyl trimethoxy silane | 12 | 0 |
| 2,2-Dimethoxy-2-phenylacetophenone | 1 | 2 |
| 1-Hydroxycyclohexyl phenyl ketone | 0 | 2.5 |
| 2,2'-Bis(o-chlorophenyl)-4,4',5,5'-tetraphenyl biimidazole | 1.5 | 0 |
| 4-Methyl-4H-1,2,4-triazole-3-thiol | 1 | 0 |

The liquid was poured into the mold and polymerized for 5 minutes in a nitrogen atmosphere using a Model LY315 UV Exposure Unit from Mega Electronics, Ltd., Safron Walden, Essex, England. After polymerization the molded part was removed from the mold and then baked to minimize shrinkage after assembly of the connector device.

The optical fibers 2 were prepared and aligned on wall 2423 using a 5 millimeter long silicon alignment block 2476 having nine trapezoidal cross section grooves 2475. The grooves 2475 were formed by anisotropically etching the silicon to form grooves whose walls are aligned from the vertical with a 57 degree silicon crystal plane angle. The grooves were 110 microns wide. The fibers were adhered to wall 2423 using liquid filler material 2443 having composition 2 described in Table I. A hand held UV wand such as a Teklite Model ELC-400 from Electrolite Corporation, Danbury Connecticut was used to photopolymerize material 2443. After positioning wall 2434+2424 relative to wall 2433+2423 the same photopolymerizable material 2443 (composition 2 described in Table I) was used to fill the space between the fibers and between wall portions 2434B and 2433B. Capillary attraction prevented this material from flowing past edges 2425 and 2429. The device was flooded with light with the same hand held UV wand to harden or fully polymerize the material. A mating device 2300, essentially as shown as device 14 in FIG. 22 was used to connect to device 2400.

EXAMPLE 2

An assembly was constructed essentially as shown in FIG. 11. The waveguide connector 1400 was fabricated having ten waveguides spaced on 250 micron centers, symmetrically disposed about the center of the connector. The overall connector 1400 was approximately 12 millimeters wide and the walls 1433,1434 were approximately 30 millimeters long. The portion 1453 of walls 1433,1434 extended approximately 9 millimeters beyond the center of the waveguide device 1401. Each wall 1433,1434 was 340 microns thick. The waveguide device 1401 was 120 microns thick, having a 50 micron waveguide layer. The waveguides were 50 microns wide. Walls 1423,1424 were omitted since this connector 1400 was intended to be permanently mated to a connector 1300, fabricated essentially as shown in FIG. 11. After assembly of each connector and mating of connectors 1400 and 1300 a liquid photopolymerizable filler (composition 1 in Table I) was used to fill the V shaped space between the corresponding portions of waveguide devices 1401 and 1301. The presence of this filler minimizes reflection losses as light is transmitted from the end of one waveguide 1411 to a corresponding waveguide 1311. Compositions used for waveguide layers 1303,1403 are disclosed in Table IV of U.S. Pat. No. 5,062,681. Compositions used for the elements 1304,1404,1305,1405 are disclosed in Tables V and VI of U.S. Pat. No. 5,062,681. The walls 1323,1324,1333,1334,1423,1424, 1433,1434 were made of composition 2 described in Table I herein.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An optical waveguide connector, comprising:
    a first optical waveguide device including:
        a first photohardened layer having a first edge, a second edge, a first side, a second side, non-waveguide regions, at least a first optical waveguide extending from the first edge to the second edge and from the first side to the second side, the waveguide having an optical axis and for channeling and transmitting light between the first and second edges,
        a first photohardened element having a first edge, a second edge, a first side and a second side, the first side of the first element laminated to the first side of the first layer, and
        a second photohardened element having a first edge, a second edge, a first side and a second side, the first side of the second element laminated to the second side of the first layer, the non-waveguide regions and the first and second elements enclosing the waveguides except at the first and second edges;
    a housing including:
        a first wall having a first edge, a second edge, a first side and a second side, the first side of the first wall adhered to and substantially covering the second side of the first element,
        a second wall having a first edge, a second edge, a first side and a second side, the first side of the second wall adhered to and substantially covering the second side of the second element, and
        the first and second walls providing mechanical rigidity to the device; and
    wherein the first optical waveguide device and the housing further comprise:
        first means for mechanically coupling and optically aligning a first end of the first waveguide to a corresponding end of a second waveguide in a second optical waveguide device of a second optical connector; and
        second means for mechanically coupling and optically aligning a second end of the first waveguide (i) to a corresponding end of a third waveguide in a third optical waveguide device or (ii) to at least a corresponding first optical fiber.

2. The optical waveguide connector of claim 1, wherein the housing further comprises:
    a third wall having a first edge, a second edge, a first side and a second side, a portion of the first side of the third wall adhered to the second side of the first wall, and
    a fourth wall having a first edge, a second edge, a first side and a second side, the first side of the fourth wall adhered to the second side of the second wall.

3. The optical waveguide connector of claim 2, wherein the first means comprises third means for optically aligning the optical axis of the first waveguide with an optical axis of the second waveguide in the second optical waveguide device of the second optical connector, the third means comprising at least one of the third wall and the fourth wall having a first end portion which diverges from the other one of the third wall and the fourth wall.

4. The optical waveguide connector of claim 2, wherein the first means comprises fourth means for mechanically coupling the first end of the first waveguide to a corresponding end of the second waveguide in the second optical waveguide device of the second optical connector, the fourth means comprising:
    the first edges of the third wall and the fourth wall spaced from the first edges of the first wall, the second wall, the first layer, the first element, and the second element such that the second sides of the first wall and the second wall have areas which are not covered by the third wall and the fourth wall and which are for inserting in a friction fit manner in a recess in the second optical connector.

5. The optical waveguide connector of claim 2, further comprising:
    a fourth stacked optical waveguide device including:
        a first photohardened layer having a first edge, a second edge, a first side and a second side, non-waveguide regions, and at least a first optical waveguide extending from the first edge to the second edge and from the first side to the second side, the waveguide having an optical axis and for channeling and transmitting light between the first and second edges,
        a first photohardened element having a first edge, a second edge, a first side and a second side, the first side of the first element laminated on the first side of the first layer; and a second photohardened element having a first edge, a second edge, a first side and a second side, the first side of the second element laminated on the second side of the first layer, the non-waveguide regions and the first and second elements enclosing the first waveguide except at the first and second edges; and the housing further comprising:
a fifth wall having a first edge, a second edge, a first side and a second side, the first side of the fifth wall adhered to the second side of the third wall, the second side of the fifth wall adhered to the second side of the first element of the fourth device;

a sixth wall having a first edge, a second edge, a first side and a second side, the first side of the sixth wall adhered to the second side of the second element of the fourth device; and a seventh wall having a first edge, a second edge, a first side and a second side, the first side of the seventh wall adhered to the second side of the sixth wall;

the first means including fifth means for mechanically coupling and optically aligning first ends of the first waveguide in the fourth device to a corresponding end of another waveguide in the second optical waveguide device; and the second means including sixth means for mechanically coupling and optically aligning a second end of the first waveguide in the fourth device (i) to a corresponding end of another waveguide in the third optical waveguide device or (ii) to a corresponding optical fiber.

6. The optical waveguide connector of claim 2, wherein the first means comprises:
a slot or recess defined by the third wall first side, the fourth wall first side, the first wall first edge, the second wall first edge, the first layer first edge, the first element first edge and the second element first edge, the slot or recess for receiving in a friction fit manner the end of the second optical waveguide device.

7. The optical waveguide connector of claim 6, wherein the first means further comprises each one of the first wall, the second wall, the first layer, the first element and the second element having a third planar edge and a fourth planar edge, the third and fourth planar edges intersecting ends of the first edges, the third planar edges spaced a distance from the fourth planar edges such that the distance progressively increases as distance from the first edges increases,
such that the slot or recess is further defined by the third and fourth edges which guide the second optical waveguide device to a mated position when inserted in the slot or recess.

8. The optical waveguide connector of claim 2, wherein the first means comprises:
an alignment slot in the third wall for receiving an alignment pin on the second connector.

9. The optical waveguide connector of claim 2, wherein the first means comprises:
an H shaped alignment coupler having a first confined space and a second confined space, the first confined space for mating with an alignment slot in the second connector; and
an alignment slot in the first wall, the second wall, the third wall, the fourth wall, the first layer, the first element and the second element for receiving the second confined space of the H shaped alignment coupler.

10. The optical waveguide connector of claim 1, wherein the first means is repetitively attachable to and detachable from the second optical waveguide device.

11. The optical waveguide connector of claim 1, wherein the first means comprises third means for optically aligning the optical axis of the first waveguide with an optical axis of the second waveguide in the second optical waveguide device of the second optical connector, the third means comprising:
a first planar alignment face for being positioned in a plane with a corresponding planar alignment face on the second optical waveguide device.

12. The optical waveguide connector of claim 1, wherein the first means comprises third means for optically aligning the optical axis of the first waveguide with an optical axis of the second waveguide in the second optical waveguide device of the second optical connector, the third means comprising each one of the first wall, the second wall, the first layer, the first element, and the second element having a third planar edge and a fourth planar edge, the third and fourth planar edges intersecting ends of the first edges, the third planar edges spaced a distance from the fourth planar edges such that the distance progressively increases as distance from the first edges increases.

13. The optical waveguide connector of claim 1, wherein the first means comprises third means for optically aligning the optical axis of the first waveguide with an optical axis of the second waveguide in the second optical waveguide device of the second optical connector, the third means comprising each one of the first wall, the second wall, the first layer, the first element, and the second element having a third edge and a fourth edge, the third and fourth edges intersecting ends of the first edges, the third and fourth edges substantially parallel to one another except where they have indentations or projections.

14. The optical waveguide connector of claim 13, wherein the first, third and fourth edges define a recess for receiving the second optical waveguide device with edges substantially parallel to one another except where they have mating projections or mating indentations.

15. The optical waveguide connector of claim 1, wherein the first edges of the first wall, the second wall, the first layer, the first element, and the second element are substantially in a V shape.

16. The optical waveguide connector of claim 1, wherein the first edges of the first wall, the second wall, the first layer, the first element, and the second element are substantially in a keystone shape.

17. The optical waveguide connector of claim 1, wherein the first device includes a plurality of the first waveguides; and further comprising:
a first plurality of optical fibers, each of the fibers comprising a cylindrical core having an optical axis, a cylindrical tubular cladding surrounding the core, and a protective jacket surrounding the cladding, second ends of the waveguides coupled by the second means to corresponding ones of the first plurality of optical fibers such that the optical axes of the waveguides are substantially in alignment with the optical axes of the coupled fibers.

18. The optical waveguide connector of claim 17, wherein the first layer has a thickness of about 5 to 6 microns and the first plurality of optical fibers are single mode optical fibers with the cores having a light guiding diameter of about 7 microns.

19. The optical waveguide connector of claim 1, wherein each one of the first and second elements comprise at least a pair of photohardened films laminated together.

20. The optical waveguide connector of claim 1, wherein the first means comprises:
a protrusion or recess in the first edge of the first wall, the second wall, the first layer, the first element and the second element for receiving a mating recess or mating protrusion in a first edge of the second connector.

21. The optical waveguide connector of claim 1, wherein the first means comprises:
an alignment pin on the first wall for inserting into an alignment slot in the second connector.

22. The optical waveguide connector of claim 1, wherein the first means comprises:
an H shaped alignment coupler having a first confined space and a second confined space, the first confined space for mating with an alignment slot in the second connector; and
an alignment slot in the first wall, the second wall, the first layer, the first element and the second element for receiving the second confined space of the H shaped alignment coupler.

23. The optical waveguide connector of claim 1, wherein the first means comprises:
recesses in the first edges of the first layer, the first element and the second element for receiving optical fibers end portions.

24. An optical waveguide connector assembly, comprising:
a first optical waveguide connector comprising:
a first optical waveguide device including:
a first photohardened layer having a first edge, a second edge, a first side and a second side, non-waveguide regions, and a first plurality of optical waveguides extending from the first edge to the second edge and from the first side to the second side, the waveguides having optical axes and for channeling and transmitting light between the first and second edges,
a first photohardened element having a first edge, a second edge, a first side and a second side, the first side of the first element laminated on the first side of the first layer; and
a second photohardened element having a first edge, a second edge, a first side and a second side, the first side of the second element laminated on the second side of the first layer, the non-waveguide regions and the first and second elements enclosing the waveguides except at the first and second edges;
a first housing including:
a first wall having a first edge, a second edge, a first side and a second side, the first side of the first wall adhered to the second side of the first element, and
a second wall having a first edge, a second edge, a first side and a second side, the first side of the second wall adhered to the second side of the second element,
a third wall having a first edge, a second edge, a first side and a second side, a portion of the first side of the third wall adhered to the second side of the first wall, and
a fourth wall having a first edge, a second edge, a first side and a second side, the first side of the fourth wall adhered to the second side of the second wall; and
wherein the first optical waveguide device and the first housing further comprise:
first means for mechanically coupling and optically aligning first ends of the first waveguides to corresponding ends of second waveguides in a second optical waveguide device of a second optical connector; and
second means for mechanically coupling and optically aligning second ends of the first waveguides (i) to corresponding ends of third waveguides in a third optical waveguide device or (ii) to corresponding optical fibers; and
a second optical waveguide connector comprising:
a second optical waveguide device including:
a first photohardened layer having a first edge, a second edge, a first side and a second side, non-waveguide regions, and a first plurality of optical waveguides extending from the first edge to the second edge and from the first side to the second side, the waveguides having optical axes and for channeling and transmitting light between the first and second edges,
a first photohardened element having a first edge, a second edge, a first side and a second side, the first side of the first element laminated on the first side of the first layer; and
a second photohardened element having a first edge, a second edge, a first side and a second side, the first side of the second element laminated on the second side of the first layer, the non-waveguide regions and the first and second elements enclosing the waveguides except at the first and second edges;
a second housing including:
a first wall having a first edge, a second edge, a first side and a second side, the first side of the first wall adhered to the second side of the first element, and
a second wall having a first edge, a second edge, a first side and a second side, the first side of the second wall adhered to the second side of the second element; and
wherein the second optical waveguide device and the second housing further comprise:
first means for mechanically coupling and optically aligning first ends of the first waveguides in the second device to corresponding ends of the first waveguides in the first device; and
second means for mechanically coupling and optically aligning second ends of the first waveguides in the second device (i) to corresponding ends of fourth waveguides in a fourth optical waveguide device or (ii) to corresponding optical fibers.

25. An optical waveguide connector, comprising:
a first plurality of optical fibers, each including:
a cylindrical core having an optical axis and a first end, and
a cylindrical tubular cladding surrounding the core except near an end portion of the core near the core first end;
a first wall having a first edge, a second edge, a first side and a second side, the first end portions of the first plurality of optical fibers positioned substantially parallel to one another on the first side of the first wall such that the first ends extend from or to the first edge;

a second wall having a first edge, a second edge, a first side and a second side, the first side of the second wall on the first end portions of the first plurality of optical fibers;

a third wall having a first edge, a second edge, a first side and a second side, the first side of the third wall adhered to the second side of the first wall, the third wall having:
- a first portion extending beyond the first edge of the first and second walls; and
- a second portion extending beyond the second edge of the first and second walls;

a fourth wall having a first edge, a second edge, a first side and a second side, the first side of the fourth wall adhered to the second side of the second wall, the fourth wall having:
- a first portion extending beyond the first edge of the first and second walls; and
- a second portion extending beyond the second edge of the first and second walls;

the first plurality of optical fibers extending between the third wall second portion and the fourth wall second portion;

a photohardened filler between the first wall, the second wall and the first end portions of the first plurality of optical fibers, the filler also between the third wall second portion, the fourth wall second portion and the first plurality of optical fibers; and the first wall, the second wall, the third wall, and the fourth wall defining a slot for mechanically coupling the first ends of the optical fibers to corresponding ends of a plurality of waveguides or optical fibers.

26. A substantially dry method of making an optical waveguide connector assembly comprising a first optical waveguide connector and a mating second optical waveguide connector, each optical waveguide connector having a waveguide device with at least one buried light channeling waveguide in a laminated and hardened matrix, comprising:

exposing to light at least a first region of a substantially dry photohardenable layer having first and second sides, with a support removably adhered to the first side, polymerizing at least one monomer in the layer and changing the refractive index of the region to form at least a first optical waveguide;

laminating a first side of a first substantially dry photohardenable element to the layer second side, with a support removably adhered to a second side of the first element;

after the exposing step and then the first laminating step, removing the support from the layer first side;

laminating a first side of a second substantially dry photohardenable element to the layer first side, with a support removably adhered to a second side of the second element;

after the second laminating step, hardening the elements and layer forming a hardened matrix, substantially fixing the indexes of refraction of the elements and the layer, and forming at least one buried waveguide;

removing the supports from the first element second side and the second element second side and adhering a first wall on the first element second side and a second wall on the second element second side;

separating the hardened matrix into a first device containing a first part of the one buried waveguide and a second device containing a second part of the one buried waveguide and providing an alignment mechanism to facilitate coupling of the first connector and the second connector such that when mated an optical axis of the first waveguide part is aligned with an optical axis of the second waveguide part; and adhering a third wall on the first wall in the second connector and a fourth wall on the second wall in the second connector thereby forming a recess for receiving the first connector in a detachable friction fit manner with the optical axis of the first waveguide part aligned with the optical axis of the second waveguide part.

27. The method of claim 26, wherein:
adhering a third wall on the first wall in the first connector and a fourth wall on the second wall in the first connector.

28. The method of claim 26, wherein:
forming the first connector such that its first device includes means for mechanically coupling and optically aligning a second end of the first waveguide part in the first device (i) to a corresponding end of a third waveguide in a third optical waveguide device or (ii) to a corresponding optical fiber; and forming the second connector such that its second device includes means for mechanically coupling and optically aligning a second end of the second waveguide part in the second device (i) to a corresponding end of a fourth waveguide in a fourth optical waveguide device or (ii) to a corresponding optical fiber.

29. A substantially dry method of making an optical waveguide connector, comprising:

adhering a first side of a first wall to a first side of a third wall such that a trailing portion of the third wall extends beyond the first wall;

positioning a first plurality of optical fibers on the second side of the first wall by locating each optical fiber in a separate groove of an alignment block with ends of the optical fibers near a first edge of the first wall, the block grooves spaced to facilitate coupling of the ends of the optical fibers to waveguides or optical fibers in a mating device;

applying a photohardenable filler where the first wall contacts the optical fibers;

hardening the photohardenable filler to secure the optical fibers to the first wall;

removing the alignment block;

placing a first side of a second wall on the optical fibers with a first edge of the second wall substantially in a plane with the first edge of the first wall;

adhering a fourth wall on the second wall second side such that a trailing portion of the fourth wall extends beyond the second wall;

applying photohardenable filler between the second side of the first wall and the first side of the second wall and between the third wall trailing portion and the fourth wall trailing portion; and hardening the photohardenable filler forming the optical waveguide connector.

30. A substantially dry method of making an optical waveguide connector, comprising:

adhering a first side of a first wall to a first side of a third wall such that a trailing portion of the third wall extends beyond the first wall;

positioning a first plurality of optical fibers on the second side of the first wall by locating each optical fiber in a separate groove of an alignment block with ends of the optical fibers near a first edge of the first wall, the block grooves spaced to facilitate coupling of the ends of the optical fibers to waveguides or optical fibers in a mating device;

applying a photohardenable filler where the first wall contacts the optical fibers;

hardening the photohardenable filler to secure the optical fibers to the first wall;

removing the alignment block;

adhering a first side of a second wall to a first side of a fourth wall, the second wall having a first edge and a second side such that a trailing portion of the fourth wall extends beyond the second wall;

placing the second wall second side on the optical fibers with the first edge of the second wall substantially in a plane with the first edge of the first wall;

applying photohardenable filler between the second side of the first wall and the first side of the second wall and between the third wall trailing portion and the fourth wall trailing portion; and hardening the photohardenable filler forming the optical waveguide connector.

31. A substantially dry method of making an optical waveguide connector, comprising:

positioning a first plurality of optical fibers on a first step portion of a first wall having a leading portion and a trailing portion by locating each optical fiber in a separate groove of an alignment block with ends of the optical fibers near a first edge of the first step portion, the block grooves spaced to facilitate coupling of the ends of the optical fibers to waveguides or optical fibers in a mating device;

applying a photohardenable filler where the first step portion contacts the optical fibers;

hardening the photohardenable filler to secure the optical fibers to the first step portion;

removing the alignment block;

placing a second step portion of a second wall having a leading portion and a trailing portion on the optical fibers with a first edge of the second step portion substantially in a plane with the first edge of the first step portion;

applying photohardenable filler between the first step portion and the second step portion and between the first wall trailing portion and the second wall trailing portion; and hardening the photohardenable filler forming the optical waveguide connector such that the first wall leading portion and the second wall leading portion define a recess for receiving the mating device.

* * * * *